United States Patent
Voss

(10) Patent No.: US 10,457,349 B2
(45) Date of Patent: Oct. 29, 2019

(54) VEHICLE COMPONENT

(71) Applicant: Darrell W. Voss, Vancouver, WA (US)

(72) Inventor: Darrell W. Voss, Vancouver, WA (US)

( * ) Notice: Subject to any disclaimer, the term of this patent is extended or adjusted under 35 U.S.C. 154(b) by 0 days.

(21) Appl. No.: 15/478,229

(22) Filed: Apr. 3, 2017

(65) Prior Publication Data

US 2018/0273136 A1 Sep. 27, 2018

Related U.S. Application Data

(63) Continuation-in-part of application No. 15/468,106, filed on Mar. 23, 2017, now abandoned.

(51) Int. Cl.
*B62K 25/28* (2006.01)
*B62K 25/30* (2006.01)

(52) U.S. Cl.
CPC .......... *B62K 25/283* (2013.01); *B62K 25/286* (2013.01); *B62K 25/30* (2013.01)

(58) Field of Classification Search
CPC ........ B62K 25/28; B62K 3/02; B62K 25/283; B62K 25/286
See application file for complete search history.

(56) References Cited

U.S. PATENT DOCUMENTS

| | | | |
|---|---|---|---|
| 4,596,302 A | 6/1986 | Suzuki et al. | |
| 4,821,833 A | 4/1989 | Yamaguchi | |
| 5,000,470 A | 3/1991 | Kamler et al. | |
| 5,207,619 A | 5/1993 | Klein et al. | |
| 5,284,354 A | 2/1994 | McWethy | |
| 5,360,088 A | 11/1994 | Voss | |
| 5,364,115 A | 11/1994 | Klein et al. | |
| 5,377,734 A | 1/1995 | Klein et al. | |
| 5,385,361 A | 1/1995 | Bei | |
| 5,405,159 A | 4/1995 | Klein et al. | |
| 5,433,465 A | 7/1995 | Klein et al. | |

(Continued)

FOREIGN PATENT DOCUMENTS

| FI | 20150329 A | 5/2017 |
|---|---|---|
| FR | 2898578 A1 | 9/2007 |

(Continued)

OTHER PUBLICATIONS

International Search Report for "Vehicle Terrain-Tracking Device," PCT/US2015/018539, Applicant: Darrell W. Voss, Date of Report: Jul. 28, 2015, International Search Authority: United States Patent and Trademark Office, Alexandria, Virginia, United States.

(Continued)

*Primary Examiner* — Anne Marie M Boehler
*Assistant Examiner* — Marlon A Arce
(74) *Attorney, Agent, or Firm* — Young's Patent Services; Bruce A Young

(57) ABSTRACT

A vehicle component that can include a suspension system for bicycles, electric bicycles, or electric scooters. The vehicle component can include a sliding four-bar system with a link pivotally connecting a swing arm to the front triangle and a sliding link slidably connecting the swing arm to a front triangle bottom portion. The resulting suspension system can be optimized to balance forces of generate a balance of forces between of drive and driven loads against the mass of the rider and inertia while still free for the rear wheel to trace the ground.

23 Claims, 18 Drawing Sheets

(56) References Cited

U.S. PATENT DOCUMENTS

| | | | |
|---|---|---|---|
| 5,452,911 A | 9/1995 | Klein et al. | |
| 5,470,091 A | 11/1995 | Voss et al. | |
| 5,499,864 A | 3/1996 | Klein et al. | |
| 5,509,679 A | 4/1996 | Leitner | |
| 5,517,878 A | 5/1996 | Klein et al. | |
| 5,553,881 A * | 9/1996 | Klassen | B62K 25/286 280/283 |
| 5,557,982 A | 9/1996 | Voss et al. | |
| 5,586,780 A | 12/1996 | Klein et al. | |
| 5,611,557 A | 3/1997 | Ferris et al. | |
| 5,626,355 A | 5/1997 | Voss et al. | |
| 5,678,837 A | 10/1997 | Leitner | |
| 5,692,764 A | 12/1997 | Klein et al. | |
| 5,743,547 A | 4/1998 | Voss et al. | |
| 5,772,228 A | 6/1998 | Owyang | |
| 5,791,674 A | 8/1998 | D'Aluisio et al. | |
| 5,826,899 A | 10/1998 | Klein et al. | |
| 5,906,385 A | 5/1999 | Voss | |
| 5,944,932 A | 8/1999 | Klein et al. | |
| 5,988,741 A | 11/1999 | Voss et al. | |
| 6,032,971 A | 3/2000 | Herder | |
| 6,109,636 A | 8/2000 | Klein et al. | |
| 6,170,845 B1 | 1/2001 | Tseng | |
| 6,206,396 B1 | 3/2001 | Smith | |
| 6,361,059 B1 | 3/2002 | Ellsworth | |
| 6,609,722 B1 | 8/2003 | Miyoshi et al. | |
| RE38,669 E | 12/2004 | Voss et al. | |
| 7,048,292 B2 | 5/2006 | Weagle | |
| 7,100,930 B2 | 9/2006 | Saiki | |
| 7,128,329 B2 | 10/2006 | Weagle | |
| 7,147,238 B2 | 12/2006 | Oi | |
| 7,350,787 B2 | 4/2008 | Voss | |
| 7,395,892 B2 | 7/2008 | Alonzo | |
| 7,494,146 B2 | 2/2009 | Tseng | |
| 7,556,276 B1 | 7/2009 | Dunlap | |
| 7,566,066 B2 | 7/2009 | Chang et al. | |
| 7,661,503 B2 | 2/2010 | Weagle | |
| 7,717,212 B2 | 5/2010 | Weagle | |
| 7,722,072 B2 | 5/2010 | Hoogendoorn | |
| 7,815,207 B2 | 10/2010 | Currie | |
| 7,828,314 B2 | 11/2010 | Weagle | |
| 7,837,213 B2 | 11/2010 | Colegrove et al. | |
| 8,272,658 B2 | 9/2012 | Hoogendoorn | |
| 8,382,136 B2 | 2/2013 | Beale et al. | |
| 8,622,411 B1 | 1/2014 | Chamberlain | |
| 9,039,026 B2 | 5/2015 | Hudec | |
| 9,242,693 B2 | 1/2016 | Voss | |
| 9,988,122 B2 * | 6/2018 | Pedretti | B62K 13/08 |
| 2002/0180166 A1 | 12/2002 | Voss | |
| 2003/0011167 A1 | 1/2003 | Turner | |
| 2006/0063624 A1 | 3/2006 | Voss | |
| 2006/0064223 A1 | 3/2006 | Voss | |
| 2007/0063476 A1 | 3/2007 | Yu | |
| 2008/0035431 A1 | 2/2008 | Vroomen et al. | |
| 2008/0067772 A1 * | 3/2008 | Weagle | B62K 25/286 280/124.134 |
| 2008/0238030 A1 | 10/2008 | Tseng | |
| 2008/0258517 A1 | 10/2008 | Julliard et al. | |
| 2008/0272560 A1 | 11/2008 | Voss | |
| 2009/0160156 A1 | 6/2009 | Yu | |
| 2009/0315296 A1 | 12/2009 | Berthold | |
| 2009/0322055 A1 * | 12/2009 | Arraiz | B62K 25/286 280/284 |
| 2011/0233892 A1 | 9/2011 | Domahidy | |
| 2012/0126506 A1 * | 5/2012 | Zawistowski | B62K 25/28 280/275 |
| 2013/0020782 A1 | 1/2013 | Hoogendoom | |
| 2014/0265208 A1 | 9/2014 | Voss | |
| 2014/0265227 A1 | 9/2014 | Voss | |
| 2016/0031521 A1 | 2/2016 | Voss | |
| 2016/0083042 A1 | 3/2016 | Voss | |
| 2016/0368559 A1 | 12/2016 | Voss | |
| 2018/0304958 A1 | 10/2018 | Madsen | |

FOREIGN PATENT DOCUMENTS

| | | | |
|---|---|---|---|
| GB | 228682 A | 2/1925 | |
| WO | 1995029838 A1 | 11/1995 | |
| WO | 2001058748 A1 | 8/2001 | |
| WO | 2012024697 | 3/2012 | |
| WO | 2014152035 A3 | 12/2014 | |
| WO | 2015134538 A1 | 9/2015 | |

OTHER PUBLICATIONS

Matt Brett, Suspension stems are back!, Road.CC, Dec. 3, 2014, Farrelly Atkinson Ltd., Bath, United Kingdom, Accessed on the Internet at: http://road.cc/content/news/164555-naild-launches-r3act-suspension-stem-60mm-travel on Aug. 29, 2016.

David Arthur, Suspension stems are back pt2! ShockStop hits Kickstarter target with pivoting suspension stem, Road.CC, Sep. 10, 2015, Farrelly Atkinson Ltd., Bath, United Kingdom, Accessed on the Internet at: http://road.cc/content/news/163688-suspension-stems-are-back-pt2-shockstop-hits-kickstarter-target-pivoting on Aug. 29, 2016.

Cunningham, Richard, First Ride: Promising New Suspension Design From an Unlikely Source, Feb. 23, 2018, Retrieved from https://www.pinkbike.com/news/first-ride-promising-new-suspension-design-from-an-unlikely-source.html, and https://www.pinkbike.com/u/RichardCunningham/album/Damon-Madsen/ on Feb. 26, 2018.

Cunningham, Richard, Polygon Square One EX9 and its R3ACT Suspension—Where it Came From and How it Works, Apr. 12, 2017, Retrieved from https://www.pinkbike.com/news/polygon-square-one-ex9-and-its-r3act-suspension-where-it-came-from-and-how-it-works-2017.html on Feb. 26, 2018.

Newman, Adam, Exclusive: Dirt Rag test rides new prototype from Chris Currie and Speedgoat Cycles, Dirtrag, Apr. 15, 2015, Retrieved from http://dirtragmag.com/exclusive-dirt-rag-test-rides-new-prototype-from-chris-currie-and-speedgoat-cycles/ on Mar. 4, 2018.

Rohde, Drew, Elevating More than Chainstays, Mar. 2017, Retrieved from http://www.bluetoad.com/publication/?=380382&ver=html5 &p=90# on May 4, 2017.

KIPO, International Search Report for PCT/US2018/023462, dated Jul. 6, 2018.

KIPO, Written Opinion of the International Search Authority for PCT/US2018/023462, dated Jul. 6, 2018.

USPTO, Final Office Action for related U.S. Appl. No. 14/956,274, dated Jul. 5, 2018.

USPTO, Non-Final Office Action for related U.S. Appl. No. 14/956,274, dated Nov. 3, 2017.

USPTO, Non-Final Office Action for related U.S. Appl. No. 14/956,274, dated Dec. 17, 2018.

Young, Bruce, Response to Final Office Action for related U.S. Appl. No. 14/956,274, dated Oct. 29, 2018.

Young, Bruce, Response to Non-Final Office Action for related U.S. Appl. No. 14/956,274, dated Mar. 5, 2018.

USPTO, Non-Final Office Action for related U.S. Appl. No. 15/796,053, dated Apr. 18, 2019.

Young, Bruce, Response to Non-Final Office Action for related U.S. Appl. No. 14/956,274, dated Feb. 26, 2019.

* cited by examiner

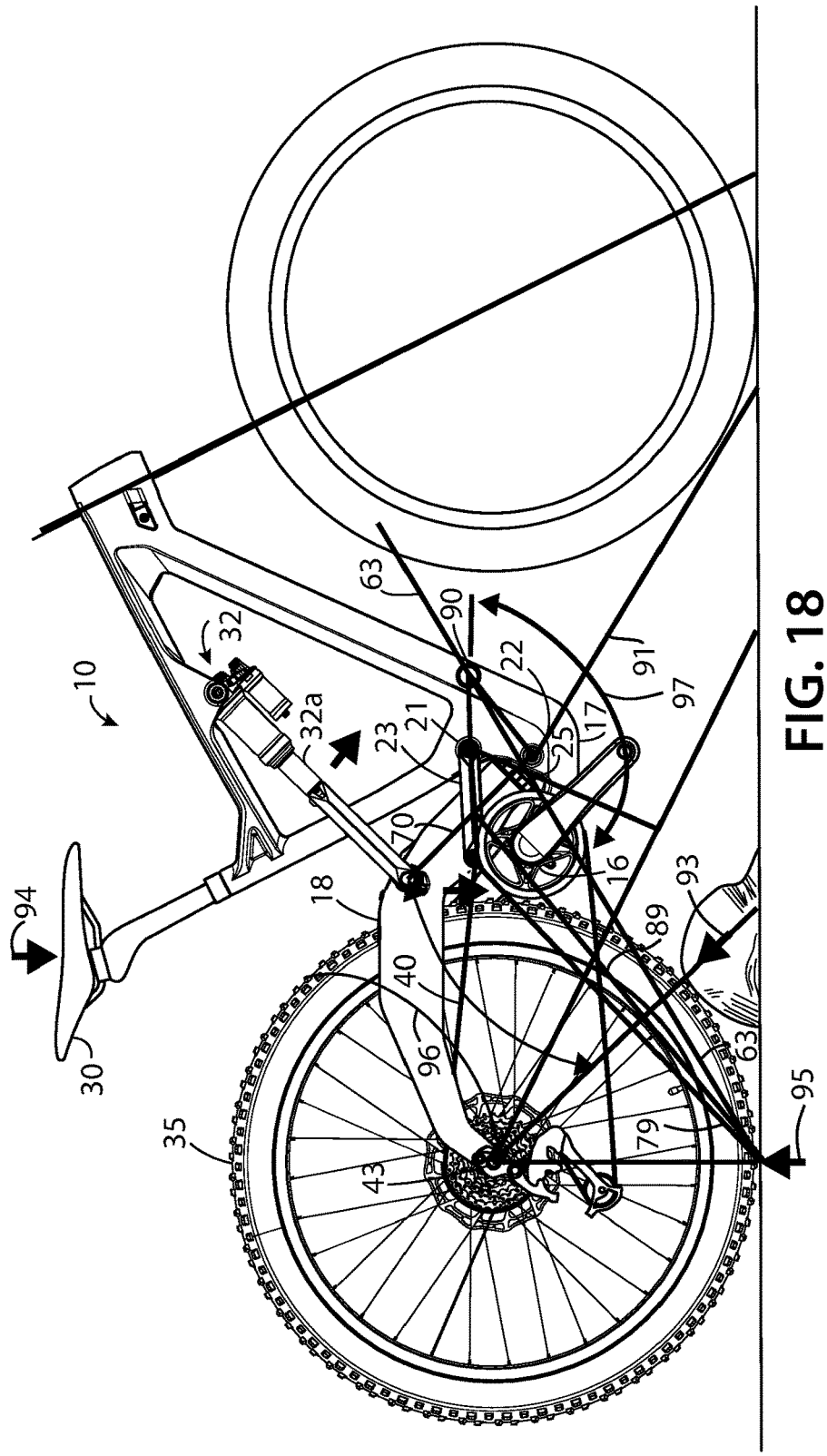

VEHICLE COMPONENT

BACKGROUND

The present disclosure relates to vehicles and vehicle components. These vehicles can include, but are not limited to, bicycles, electric bicycles, motorized bicycles, motorcycles and the like.

For simplicity, portions of this disclosure will discuss bicycles, but this is only done for the convenience of the reader. The vehicle components, suspension systems, and the like, can apply to a wide range of human powered and motorized vehicles.

Bicycles and related vehicles often include front and/or rear suspension in an attempt to cushion, or suspend, the rider from uneven terrain with the aim of increasing control, safety, and comfort. Since the 1990s, attempts have been made to perfect bicycle suspension systems, especially with mountain bicycles because they are often ridden uneven terrain. Early suspension designs suffered from several problems. For example, in some early designs, known as a single-pivot rear suspension, a swing arm fixed at one end to the rear wheel pivots from either the seat tube or downtube near the bottom bracket. The swing arm can be suspended from the top of the seat tube near the seat by a spring dampener or other shock absorber. One of the problems with this type of suspension is the tendency of the pedals to move or bob up and down as the swing arm pivots the rear wheel on uneven terrain. Pedal bob is caused by the tension and compression on the chain as the rear wheel pushes up and then swings back. Another is the tendency for rear wheel to effectively lose contact with the riding surface because the upward force on the contract surface of the rear wheel during pedaling tends to rotate the swing arm and lift the wheel away from the ground.

One early attempt to solve these problems, that is still in use today, is known as a Horst link suspension. This suspension attempts to isolate the pedal forces and braking force from the suspension. The Horst link suspension uses what is called a four-bar linkage. A four-bar linkage includes four members called "bars" or "links" connected together by pivoting joints or a by a combination of pivoting and sliding joints. The Horst link suspension uses four pivoting joints. The four bars or links in the Horst link suspension can include the chain stay, the seat stay, a portion of the seat tube, and a lever arm. One end of the chain stay is pivotally connected to the seat tube above the bottom bracket. The other end of the chain stay is connected to the end of the seat stay near rear dropout (i.e. the portion of the seat stay the holds the rear axle). The lever arm pivots at one end against the upper end of the seat stay and at the other end against an upper portion of the seat tube. A shock absorber suspends the mid-point of the lever arm to an upper portion of the frame.

Another example of a suspension that attempts to advance the art is known as the DW link suspension. The DW link suspension attempts to eliminate the tendency of the rear suspension to compress as the bike is accelerated during pedaling. Some of the energy associated with pedaling gets lost because of this compression. The compression of the rear suspension under power is known as squat. The resistance to rear suspension compression is called anti-squat. The DW-link uses a four-bar linkage that is designed to reduce the loss of energy during pedaling from suspension compression by providing more resistance to rear suspension compression (i.e. more anti-squat) at the beginning of the suspension travel than later in the suspension travel. The DW link suspension joins a rigid rear triangular portion of the bike frame to the seat tube by two short links. One of the links is pivotally connected to the bottom of the rear triangle and the bottom of the seat tube. The other link is pivotally connected between the top of the rear triangle and an upper portion of the seat tube. A spring dampener is used to dampen the rear triangle to the front frame. During hard acceleration, the upward force on the bottom of the rear wheel rotates the upper link and pushes the upper member of the rear triangle into the dampener causing it to compress. When the dampener compresses, some of the energy that would normally go into accelerating the bicycle is lost to friction. In order to prevent this, the dampener can include a restriction valve or some other mechanical or electrical locking mechanism to prevent the dampener from moving. While this prevents energy from being lost during acceleration to frictional forces of the dampener, it restricts movement of the frame. During acceleration, since the suspension is restricted or "locked out," the bicycle acts like a non-suspension bicycle, i.e. as if it has a rigid frame.

SUMMARY

The inventor set out to overcome the problems inherent in currently available bicycle suspension systems such as those described in the background section. The inventor developed a unique suspension system using a four-bar linkage. In one instance, the inventor used three pivoting joints and a sliding linkage. For example, the front frame of the vehicle, referred to here as a front triangle for convenience, can be coupled to the rear wheel via a swing arm through a sliding four-bar linkage. The sliding four-bar can include, a sliding tube forming the sliding joint and three pivoting joints. A first link can be formed by a link member that is pivotally connected on one end to the swing arm by a first pivoting joint. The opposing end of the link member can be coupled to the front triangle by a second pivoting joint. A second link can be formed between the area between the second pivoting joint and third pivoting joint along the front triangle. A third link can be formed between the third pivoting joint and the sliding juncture at a first swing arm end proximal to the front triangle. A fourth link can be formed between the first swing arm end and the pivoting joint.

While developing this system, the inventor found that he could arrange the angles and of the pivoting joints and slider, and the positions of the pivoting joint and slider in relation to the frame elements, within a range where the drive loads generate a counter balance to the inertia loading that results in very little movement between the frame elements under acceleration of the drive and driven loads and under braking. This equipoise state between of drive and driven loads against the mass of the rider and inertia, while still free for the rear wheel to trace the ground. Other systems, in contrast, damage the freedom of movement between the front and rear structure. This and other restrictions imposed by other systems severely damages the traction, safety, and suspension. For example, as previously discussed, in some systems, the dampener is activated during acceleration. This creates a loss of some of the acceleration of movement to friction in the dampener. In order to overcome this loss, systems allow the rider to manually "lock out" the movement of the dampener during acceleration. However, this defeats the purpose of suspension and can create a potentially dangerous situation when the rider hits a rock, pot hole or other obstacle.

In contrast, the inventor found that by creating an equipoise state of drive and driven loads against the mass of the rider and inertia, the position of his system could generate a sprung weight of the rider and inertia to move without restriction so that the rear wheel is free to trace the ground tracing while supporting the inertia. The acceleration of the drive and driven loads on the mass of the rider/payload do not have large effect on the compression of the frame movement while staying is a free state of movement of tire tracing the ground. The action of imputing a drive load from pedaling, a motor, or combination of pedaling and motor, for example, into driven loads of the drive terrain (pedal) creates a "chain reaction" of events that alternate drive and driven loads resulting in frame structure creating an equipoise for the frame to be stable in acceleration. The system remains in a free moving state while the rear wheel traces the terrain, without external restriction, such as hydraulic damping, allowing the contact path of the bicycle, or other vehicle with the ground to not have further resistance beyond a spring rate increase.

The arrangement of link member, sliding link, and associated pivoting joints, between the front triangle and the rear wheel connected swing arm remain in a state of free movement from terrain induced irregularities. While forces generated from acceleration are applied there is a counter balance of forces that resists a shift in movement between the front triangle and the rear wheel connected swing arm that is the result of the drive induced loads between member's forces being used to generate and offset of unwanted compression or elongation from the normal state or rest state of the bicycle.

This change in arrangement of pivot and sliding joint created dramatic and unexpected results, as compared with previous systems and the inventor's own sliding-four bar suspensions described in U.S. Patent Publication No. 2016/0368559 A1. Typically, there is a compromise between suspension travel and acceleration. A bicycle using the inventor's new suspension system in confidential testing, has better performance acceleration performance than bicycles with half the suspension travel. For example, a bicycle using the inventor's new suspension with 200 mm of suspension travel had better acceleration characteristics (i.e. is fastener) than racing or performance bicycles with half the range of travel, while increasing the usable range of suspension travel over current systems.

The inventor also discovered that applying the principles used for obtaining the equipoise state in his sliding four-bar system can be applied to other four-bar systems. For example, a first rigid link with pivotally connected between the swing arm and a lower portion of the seat tube. A second rigid link can be pivotally connected between the bottom bracket the swing arm. The second link can be pivotally connected to the swing arm, proximate to the end of the swing arm, below the swing arm pivot of the first link. This arrangement can advantageously be used for motorized bicycles such as electric bicycles.

While many of the examples and embodiments given in the summary and through portions of the disclosure are applied to bicycles, the inventor envisions that these principles can be readily applied to other human powered or motorized vehicles. In addition, the inventor envisions that this can also be readily be applied to wheeled vehicles where the vehicle is lighter than the passenger although is not limited to such. This Summary introduces a selection of concepts, in simplified form for the convenience of the reader. Many of these concepts are described in more detail in the Description. The Summary is not intended to identify essential features or limit the scope of the claimed subject matter.

DRAWINGS

FIG. 18 illustrates optimizing for a parameter of downward and upward forces for ground tracing of the vehicle of FIG. 5.

DESCRIPTION

Figure 1:
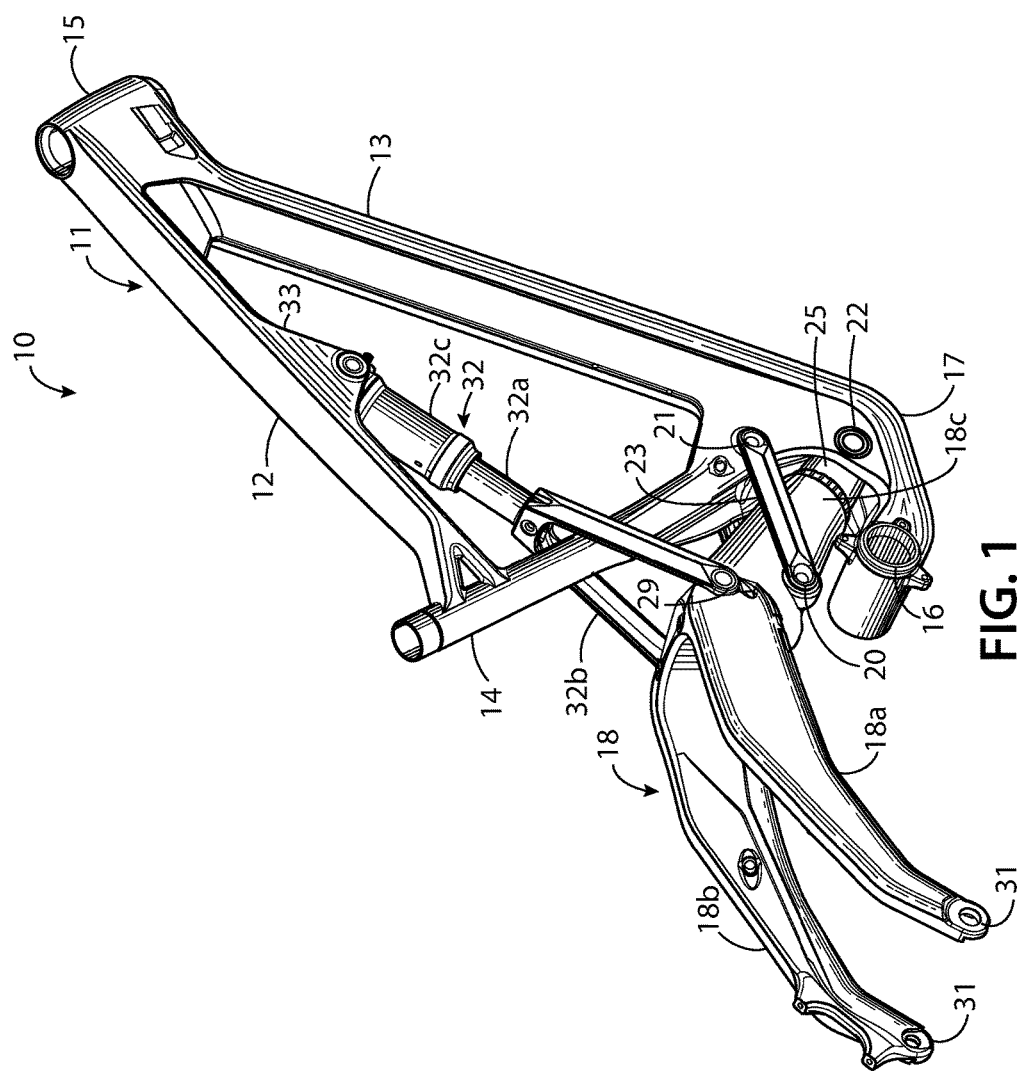
FIG. 1 illustrates a top perspective view of a bicycle frame with a sliding four-bar suspension.

The terms "left," "right," "top," "bottom," "upper," "lower," "front," "back," and "side," are relative terms used throughout the to help the reader understand the figures. Unless otherwise indicated, these do not denote absolute direction or orientation and do not imply a particular preference. When describing the figures, the terms "top," "bottom," "front," "rear," and "side," are from the perspective of an observer facing the bicycle or other vehicle. Specific dimensions are intended to help the reader understand the scale and advantage of the disclosed material. Dimensions given are typical and the claimed invention is not limited to the recited dimensions.

The following description is made with reference to figures, where like numerals refer to like elements throughout the several views.

Normal practice in vehicle design including bicycle design is to use damping to control undesirable forces, for example, the force from bumps or depressions. This dampening is typically accomplished by a shock absorber with oil damping or air damping. Typical bicycle, motorized bicycle, or motorcycle suspensions isolate the wheels from the rider or driver. As described in the background, the rear wheel can be isolated from the forward portion of the frame which can carry the rider or driver by pivoting joints and dampeners. During acceleration, the forward portion of the frame carrying the rider resists movement while the rear wheel is being driven forward by either the driving force (i.e. pedaling or motor). On conventional suspension bicycles, motorcycles, motorized bicycles, and the like, this will tend to compress the dampener. Compressing the dampener will cause a loss of energy during acceleration because the dampening will convert the energy of forward motion into friction or heat. In order to prevent this, dampeners can include a restriction valve or some other mechanical or electrical locking mechanism. This approach focuses on the suspension aspect of the vehicle frame from the point of view of damping and as a consequence, acceleration damping is view as an undesirable "side effect" that can be remedied by adjusting or locking out damping. This "conventional wisdom" is so prevalent in the bicycle industry, that is nearly impossible to buy bicycle shock absorbers that do not have a mechanism for locking out damping, with the exception of shock absorbers designed for downhill racing.

The inventor has taken a different approach. The inventor has created a vehicle system where the forces during acceleration, braking, are counterbalanced or in an equipoise state. This has led to several benefits and unexpected results. The bicycle remains stable through states of rest, acceleration, and braking. The structure of the frame in combination with the arrangement and structure of linkage elements creates a balance between opposing forces. For example, during acceleration, the resistance to forward motion from the inertia of the rider in the forward portion of the vehicle is counterbalanced by the forces of acceleration through the link members. Similarly, the forces of inertia that tend to keep the front of the vehicle moving forward during braking are counterbalanced by the forces of deceleration during braking. During both states, the frame remains in relatively the same level of squat or sag (i.e. the amount the frame moves downward due to the mass of the rider). For example, during acceleration, the damper does not compress any more than in a rest state, therefore none of the energy of acceleration is lost to dampening. This is contrary to conventional bicycle, motorized bicycle and motorcycle designs. In fact, in so called damper, requires little damping and acts more like an undampened spring. For some designs, an undampened spring may be all that is required as a suspension element.

Figure 9:
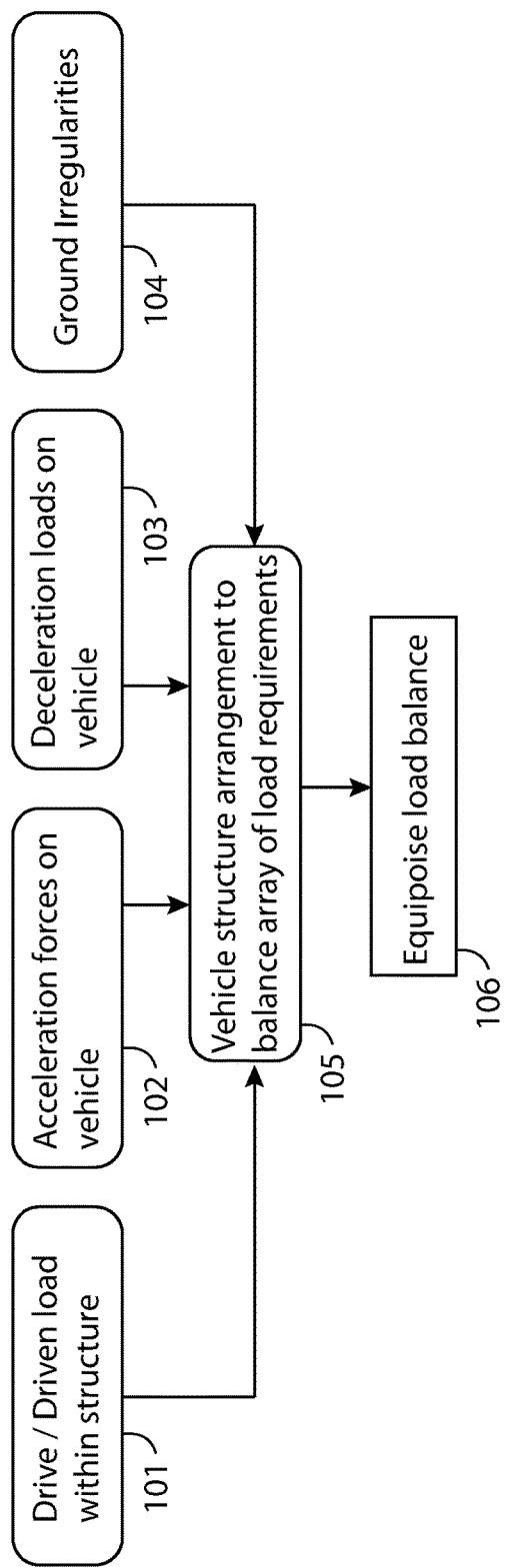
FIG. 9 illustrates a flow chart for setting parameters among four different design criteria for obtaining an equipoise balance of forces between the front and rear of the vehicle throughout the range of motion.
Figure 10:
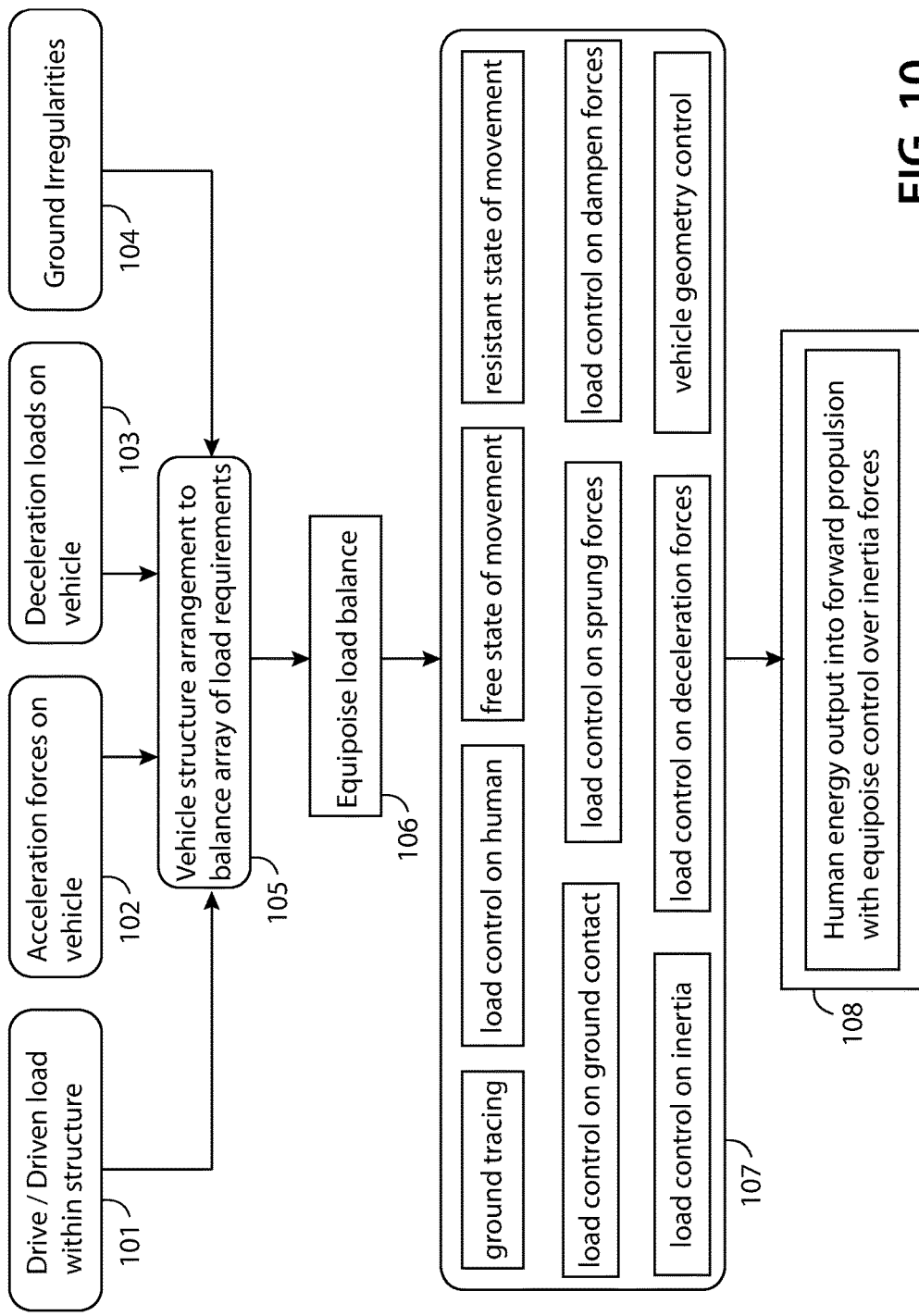
FIG. 10 illustrates a more detailed flow chart for setting parameters among four different design criteria for obtaining an equipoise balance of forces between the front and rear of the vehicle throughout the range of motion.

In FIGS. 1-8, the inventor uses a four-bar system to interface the front portion of the vehicle in this case, the front triangle of the bicycle frame to a rear portion of the vehicle. In this case, a swing arm 18 and rear wheel 35 (FIGS. 4-7). FIGS. 1-7 and FIG. 8 illustrate two examples of how the front and rear of the vehicle can be interfaced in order to maintain a balance of forces or equipoise during acceleration, braking, and ground tracing. The inventor discovered that he was able to find a range of values (i.e. angular relationships between the linkages and the frame elements as well as arrangement and location of linkages with respect to the frame elements) in the four-bar suspension where the equipoise state could be maintained during acceleration, braking, and ground tracing. In FIGS. 9 and 10, for a given vehicle, this range of values can be determined by optimizing the four parameters, drive driven loads with the structure, acceleration forces on the vehicle, deceleration loads on the vehicle, and ground irregularities. This is further examined in FIGS. 11-18 for both the vehicle component systems from FIGS. 1-7 and FIG. 8.

Figure 2:
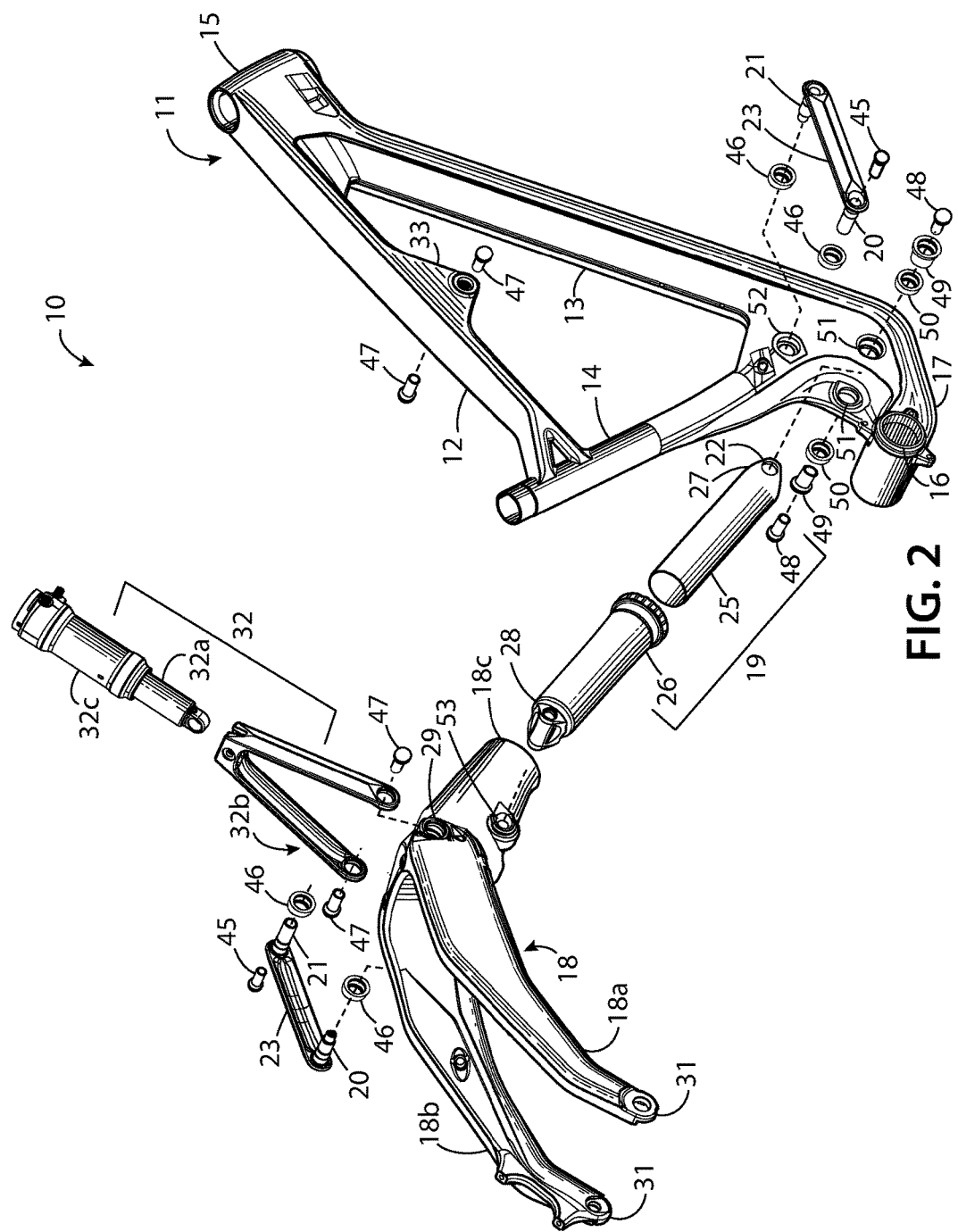
FIG. 2 illustrates an exploded perspective view of the frame with sliding four bar suspension of FIG. 1.
Figure 3:
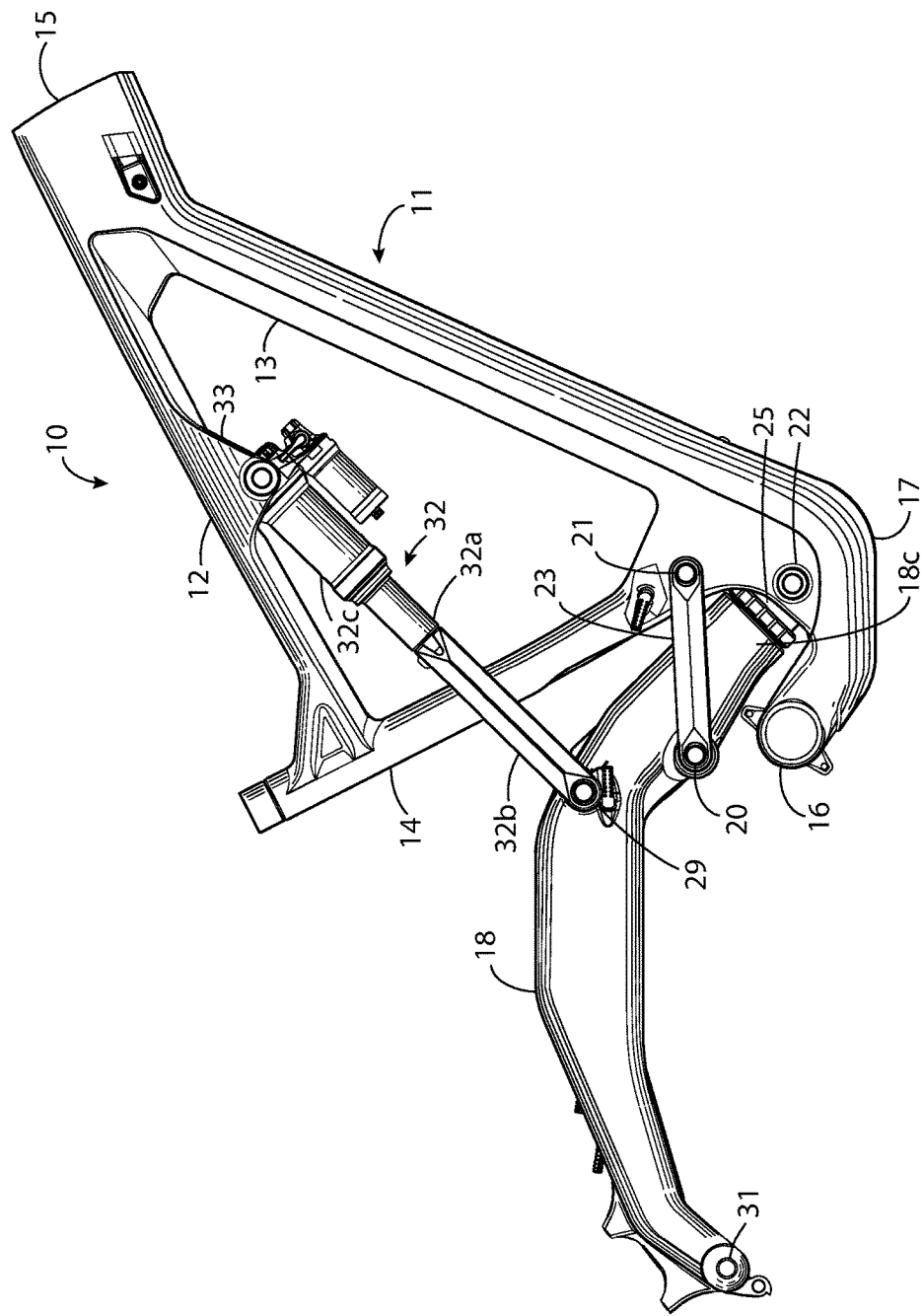
FIG. 3 illustrates a side elevation view of the frame with the sliding four bar suspension of FIG. 1

FIG. 1 illustrates a top perspective view of a portion of a bicycle frame 10 with a sliding four-bar suspension. FIG. 2 illustrates an exploded perspective view and FIG. 3 a side elevation view of the bicycle frame and sliding four bar suspension of FIG. 1. Referring to FIGS. 1-3, the bicycle frame can include a front triangle 11. Note that will this portion of the bicycle or vehicle is referred to as a front triangle 11, this term in general can include the front portion of the bicycle or vehicle that supports the mass of the rider. In addition, even though it is referred to as a "front triangle," this component is not limited to a triangular shape and can be a polygon. For example, the front triangle 11 depicted throughout this disclosure is shown as having five closed sides, a top tube 12, a down tube 13, a seat tube 14, and a head tube 15, and a front triangle bottom portion between the seat tube 14 and the down tube 13. The term "front triangle" is used for the convenience of the reader as this is an industry term. The front triangle can include three, four, five, six or more sides and fall within the meaning of front triangle.

The front triangle 11 can be fabricated from carbon fiber, titanium, aluminum, chrome molybdenum (chromoly) steel, high tensile steel, or other materials suitable for bicycle frames, electric bicycle frames, or other personal vehicles. The front triangle can include a top tube 12, a down tube 13, a seat tube 14, a head tube 15, and a bottom bracket 16. The top tube 12 and the down tube 13 can both project away from the head tube 15 at an acute angle with respect from each other. The seat tube 14 is illustrated projecting downward from the top tube 12 and joining the down tube 13 at an acute angle. The seat tube 14, the down tube 13, and the top tube 12 can be rigidly joined together to form a substantially triangular shape. Projecting from the juncture of the down tube 13 and the seat tube 14 is a front triangle bottom portion 17. A bottom bracket 16 can be located proximate to an end of the front triangle bottom portion 17 distal to juncture of the down tube 13 and the seat tube 14.

The front triangle 11 connects to a swing arm 18 via a sliding four-bar linkage. A four-bar linkage includes four members called "bars" or "links" connected together by pivoting joints or a combination of pivoting and sliding joints. In FIGS. 1-3, the four-bar linkage includes a sliding tube 19 forming a sliding joint and three pivoting joints 20, 21, 22. The four bars or links of the four-bar linkage can be as follows. A first link as the link member 23. The link member 23, is pivotally connected on one end to the swing arm 18 by pivoting joint 20 and on the opposing end to seat tube 14 by pivoting joint 21. A second link formed by the area between the pivoting joint 21 and pivoting joint 22 along the front triangle 11. A third link formed between the pivoting joint 22 and the sliding juncture at a first swing arm end 18c proximal to the front triangle 11. A fourth link formed between the first swing arm end 18c and the pivoting joint 20.

Each joint in the four-bar linkage can be restricted to one degree of freedom. For example, the pivoting joints 20, 21, 22 can be restricted to rotate around a single rotational axis and sliding link 19 can be restricted or constrained to slide along one linear axis. In addition, the range of rotation, in the case of a pivoting joints 20, 21, 22 can be restricted to a partial arc, or "pivot," to prevent the swing arm from rotating passed a certain range. Similarly, the sliding link 19 can be restricted to a move only within a linear range to also restrict the movement of the suspension. The sliding link 19 and the pivoting joints 20, 21, 22 can be low friction joints in order to prevent loss of energy during movement and wear. For example, as illustrated in FIG. 2, the sliding link 19 can include a sliding member 25 that is slidable within a hollow tube 26. In one embodiment, the sliding member 25 can slide within the hollow tube with a minimal amount of friction.

Continuing to refer to FIG. 2, the sliding member 25 includes a sliding member eyelet 27 at one end of the sliding member 25. The sliding member eyelet 27 pivotally joins the pivoting joint 22 that can be located in the front triangle bottom portion 17. The pivoting joint 22 can be pivotally connected to the front triangle bottom portion 17 with bolts 48, axle caps 50, and bearings 49 through aperture 51. The hollow tube 26 can be slidable within a hollow recess that is within the first swing arm end 18c. The end of the hollow tube 26 can include a fastener receiving portion such as the hollow tube eyelet 28 shown in FIG. 2. The hollow tube eyelet 28 can be fastened to the hollow recess of within the first swing arm end 18c by any fastener capable of withstanding the forces and torques applied to the swing arm 18. For example, a bolt, rivet, or screw. The hollow tube eyelet 28 can also be fastened to a shock absorber mounting point 29. The link member 23 can be divided into two members, one on either side of the seat tube 14 and swing arm 18. Pivoting joint 21 can mount through aperture 52 with bolts 45 and bearings 46 as illustrated. Similarly pivoting joint 20 can be mounted through aperture 53 located on the swing arm 18.

The swing arm can be forked around the rear wheel and include a first fork arm 18a and a second fork arm 18b. The ends of the first fork arm 18a and the second fork arm 18b located distal to the first swing arm end 18c can each include a rear wheel dropout 31. The rear wheel dropout 31 allows rotational coupling of a real wheel to the swing arm 18.

The swing arm 18 pivots on the pivoting joints 20, 21 shown at opposing ends of the link member 23. The rear wheel dropout 31 acts as the end of a moment arm that pivots around pivoting joints 20, 21.

Referring to FIGS. 1-3, the swing arm 18 can hang from a shock absorber 32. The shock absorber 32 can hang from a shock mounting point 34 located on a forward shock mount 33 mounted to or integral with the top tube 12. The shock absorber can alternatively hang from the down tube 13. The shock absorber 32 includes a shock shaft 32a and shock mounting arm 32b, and a shock body 32c. One end of the shock mounting arm 32b is connected to the shock shaft 32a by bolts 47 illustrated in proximity to the fork ends of the shock mounting arm 32b. The other end of the shock mounting arm 32b can be connected to the swing arm 18 through shock absorber mounting point 29. Referring to FIG. 2, the shock can be mounted to the forward shock mount 33 by bolts 47 illustrated in proximity to the forward shock mount 33.

Referring back to FIGS. 1-3, while this is a typical of a shock absorber 32 mounting configuration, other configurations can be utilized. The shock absorber 32 can be an air shock, spring damper, other shocks suitable for bicycles. One of the advantages of the vehicle suspension that is one of the subjects of this disclosure, the shock absorber 32 can require minimal damping throughout most of its travel. In some embodiments, the shock absorber can be a simple elastomer. In other embodiments, the shock absorber can be replaced with an undampened or minimally dampened spring.

Figure 4:
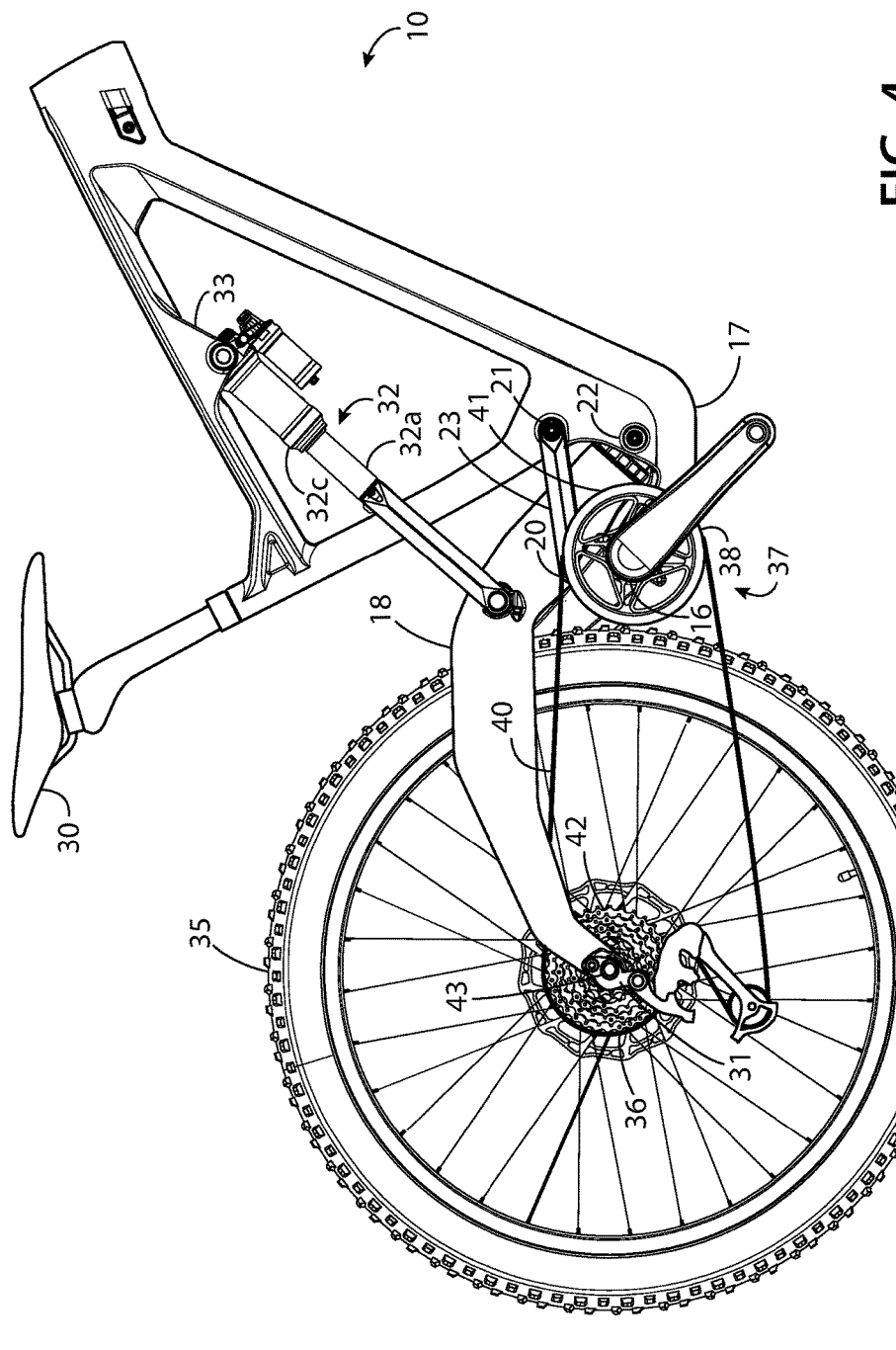
FIG. 4 illustrates a side elevation view of the suspension, the rear wheel, and the frame, in the "show room" position with no weight on the bicycle.

FIG. 4 illustrates a side elevation view of the suspension, the rear wheel, and a portion of the bicycle frame 10, in rest position without a rider. This is known as "showroom position." In showroom position, the bottom bracket 16, front triangle bottom portion 17, the crankset 37, and the seat 30 are shown in a relaxed position without any downward forces from a rider. The shock absorber 32 is shown uncompressed with the shock shaft 32a fully extended from the shock body 32c. The sliding member 25 is shown minimally extended from the swing arm 18. The link member 23 is shown slightly downward from horizontal going from pivoting joint 21 toward pivoting joint 22.

Figure 5:
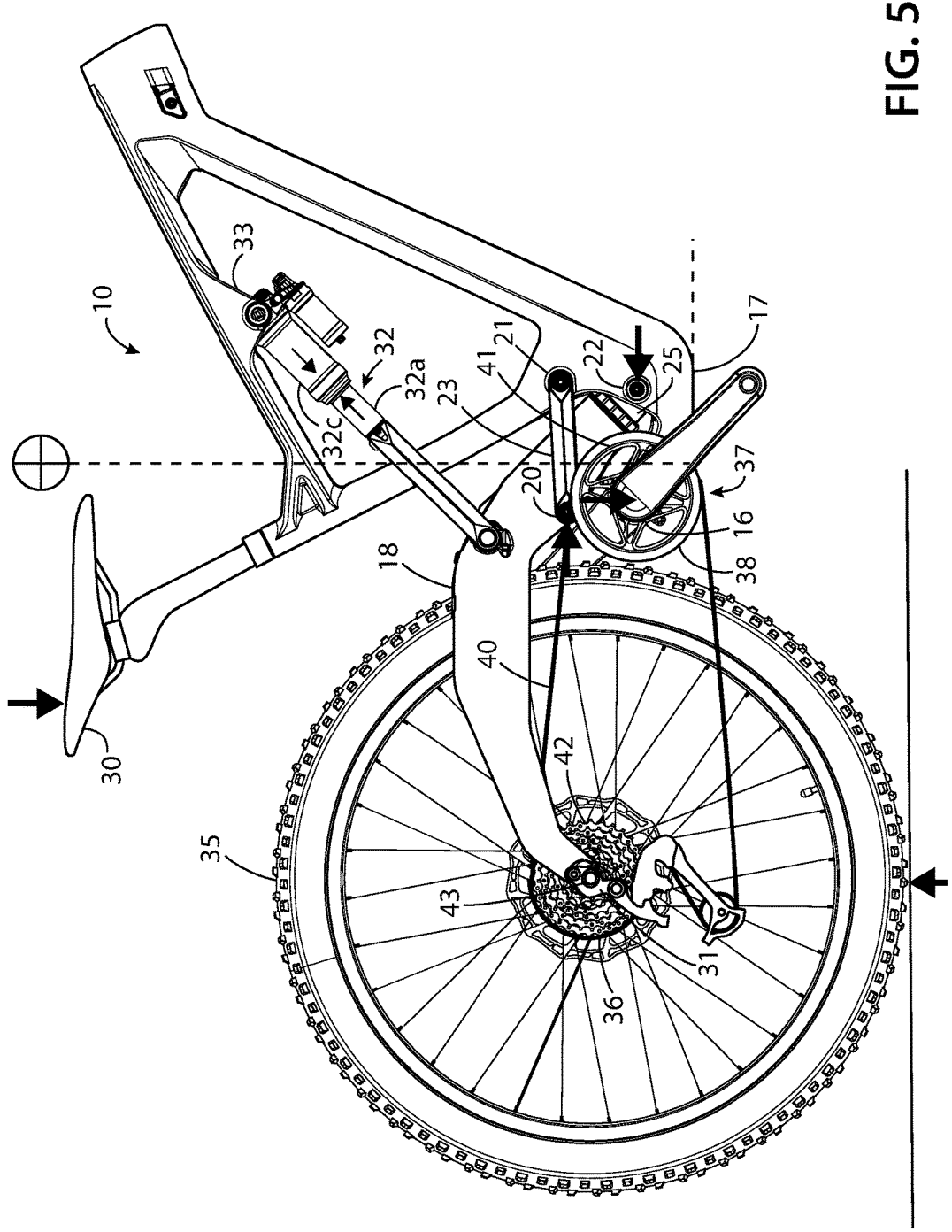
FIG. 5 illustrates a side elevation view of the suspension, the rear wheel, and the frame, showing effect of the rider's weight on seat while the bicycle is at rest.

FIG. 5 illustrates a side elevation view of the suspension, the rear wheel, and portion of the bicycle frame 10, showing effect of the rider's weight on seat 44 while the bicycle is at rest. As the rider puts his or her weight on the seat 30, the seat 30 can move down and the frame can push down or sag. Comparing FIG. 5 to the showroom position of FIG. 4, in FIG. 5, the front triangle bottom portion along with the bottom bracket 16 will move downward, the sliding member 25 extends, and the link member 23 pivots clockwise by rotating the pivoting joints 20, 21. The shock absorber 32 will compress slightly from the show room position.

Figure 6:
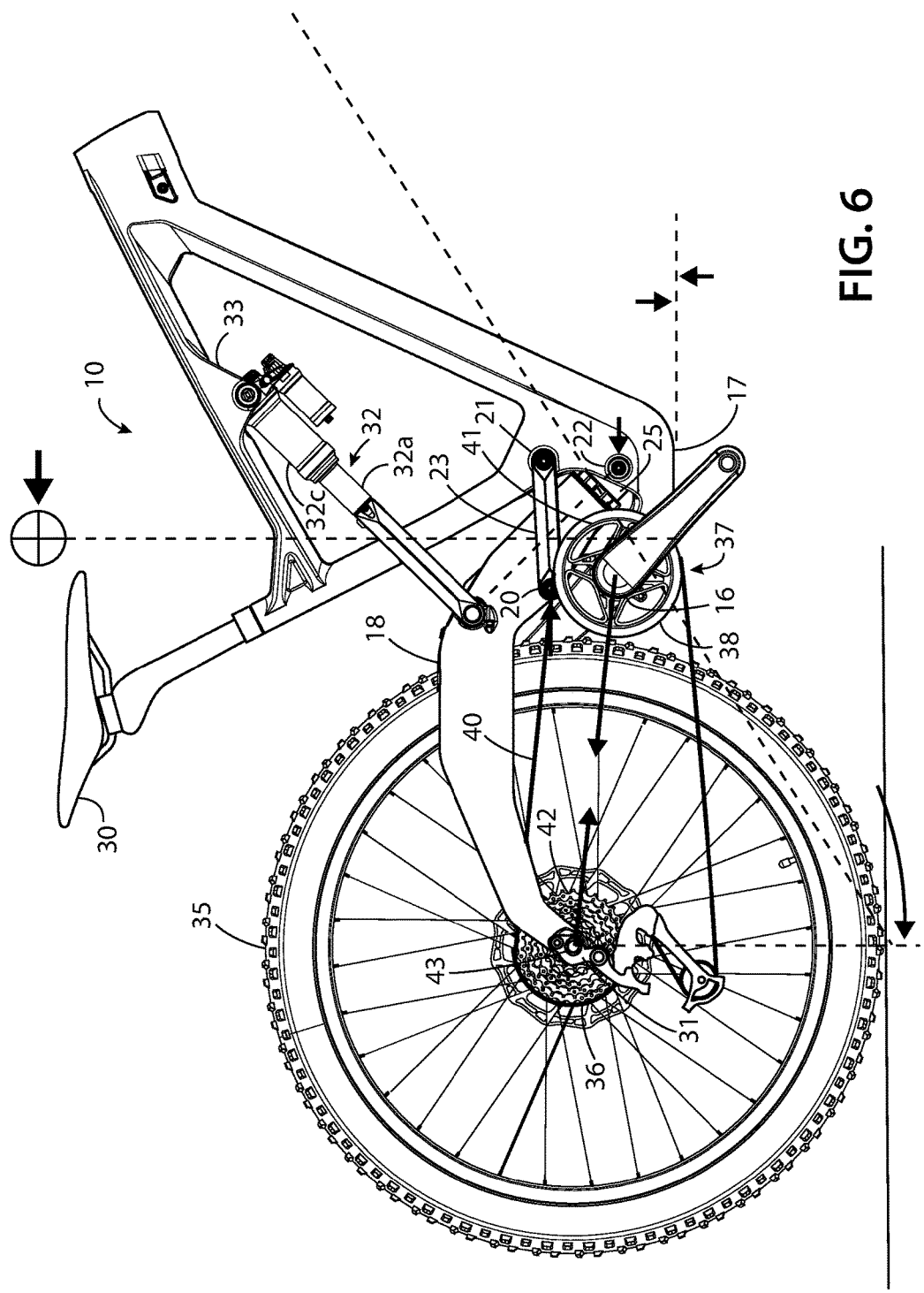
FIG. 6 illustrates a side elevation view of the suspension, the rear wheel, and the frame, showing effect of accelerating the bicycle.

FIG. 6 illustrates a side elevation view of the suspension, the rear wheel, and portion of the bicycle frame 10, showing effect of accelerating the bicycle. FIG. 6 illustrates the rear wheel 35 and cog set 36 coupled to the rear wheel dropout 31. A crankset 37 with a chain ring 38 and pedal arm 39 is coupled to the bottom bracket 16. Alternatively, an electric motor can be coupled to the chain ring 38 for power assist bicycles or motorized scooters. A chain 40 is coupled between the gears 41 on the chain ring 38 concentric to the bottom bracket 16 and the gears 42 on the cog set 36 concentric with the rear wheel 35. During acceleration, the drive load from pedaling will tension the chain 40 creating an upward force on bottom bracket 16 and a downward force on the rear axle 43 as the swing arm 18 pivots counterclockwise along the link member 23 about pivoting joints 20, 21. As a result, the front triangle bottom portion 17 pushes upward against inertial forces, the rear wheel 35 pushes downward toward the ground, and the shock absorber 32 extends. Some of the kinetic energy of forward motion is stored in the frame. This is the opposite of other typical bicycle suspension systems where a forward motion will tend to compress the shock absorber and loose energy due to the frictional forces of damping.

Figure 7:
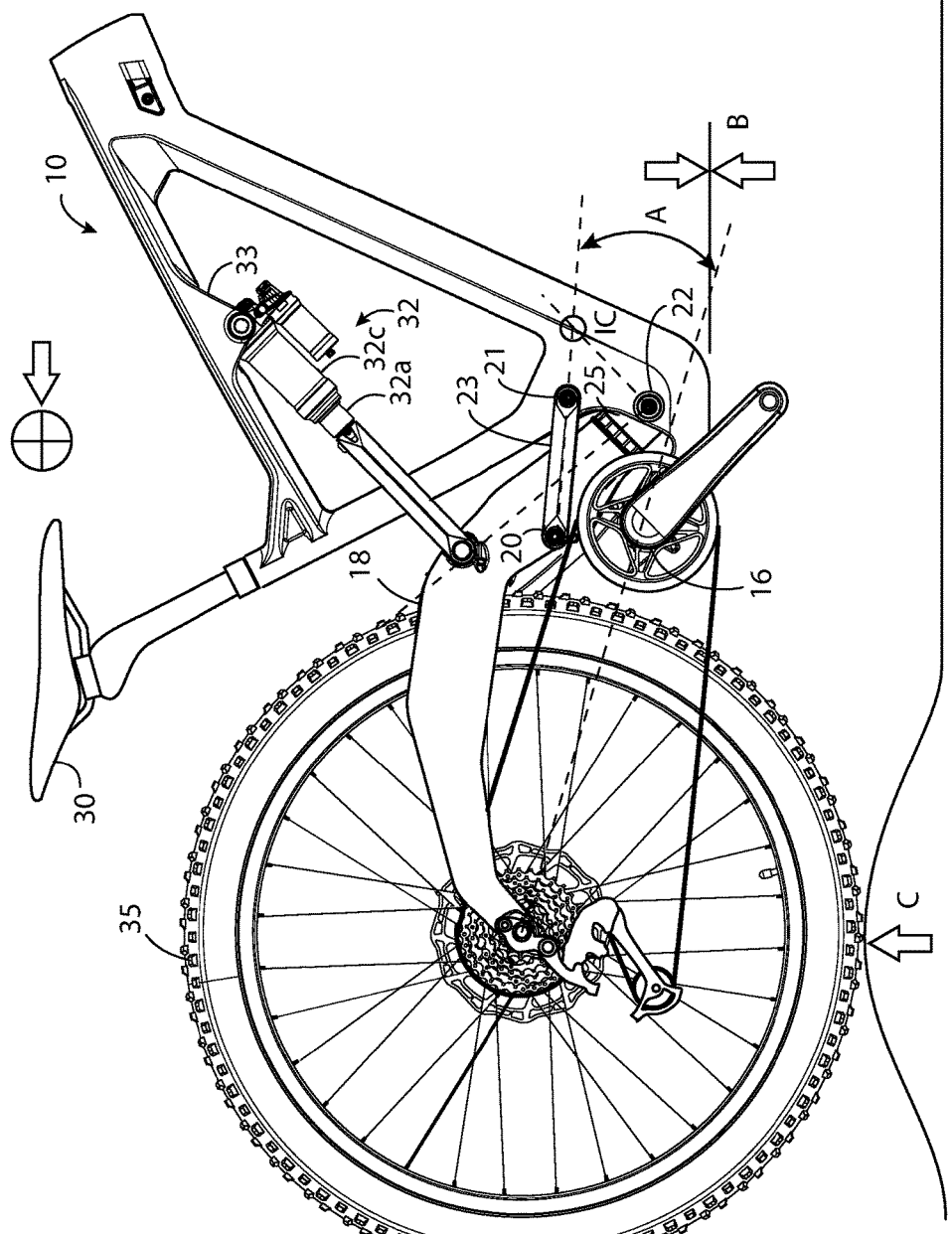
FIG. 7 illustrates a side elevation view of the suspension, the rear wheel, and the frame, showing the effect of hitting a rock or bump while accelerating the bicycle.

FIG. 7 illustrates a side elevation view of the suspension, the rear wheel 35, and a portion of the bicycle frame 10, showing the effect of hitting a rock or bump while accelerating the bicycle. As described in FIG. 4, under acceleration, the bottom bracket 16 experiences a force pushing upward and the rear axle 43 experiences a downward force pushing the rear wheel 35 into the ground as chain 40 shortens during acceleration. As the rear wheel hits a bump, rock, log, or other raised obstacle, the rear wheel 35 will left upward to trace the ground path, the swing arm 18 will pivot clockwise about the pivoting joints 20, 21 attached to opposing ends of the link members 23, the sliding member will not extend because the force from acceleration increase the drive load on the chain 40 and push the bottom bracket 16 upward countering any forces that would tend to sag the frame. As a result, this equipoise of force allows the wheel to ground trace, while the upper frame is isolated from movement. While the shock absorber 32 compresses to dampen some of the bump, much of the force is stored in the frame and then released when the frame returns to relaxed state.

The inventor found while building prototypes of his bicycle, the arrangement of link member, sliding link, and associated pivoting joints, between the front triangle and the rear wheel connected swing arm remain in a state of free movement from terrain induced irregularities. He also recognized that he could create other configurations, for example the configuration of FIG. 8, using a four-bar with four pivoting links. While forces generated from acceleration are applied there is a counter balance of forces that resists a shift in movement between the front triangle and the rear wheel connected swing arm that is the result of the drive induced loads between member's forces being used to generate and offset of unwanted compression or elongation from the normal state or rest state of the bicycle.

Figure 8:
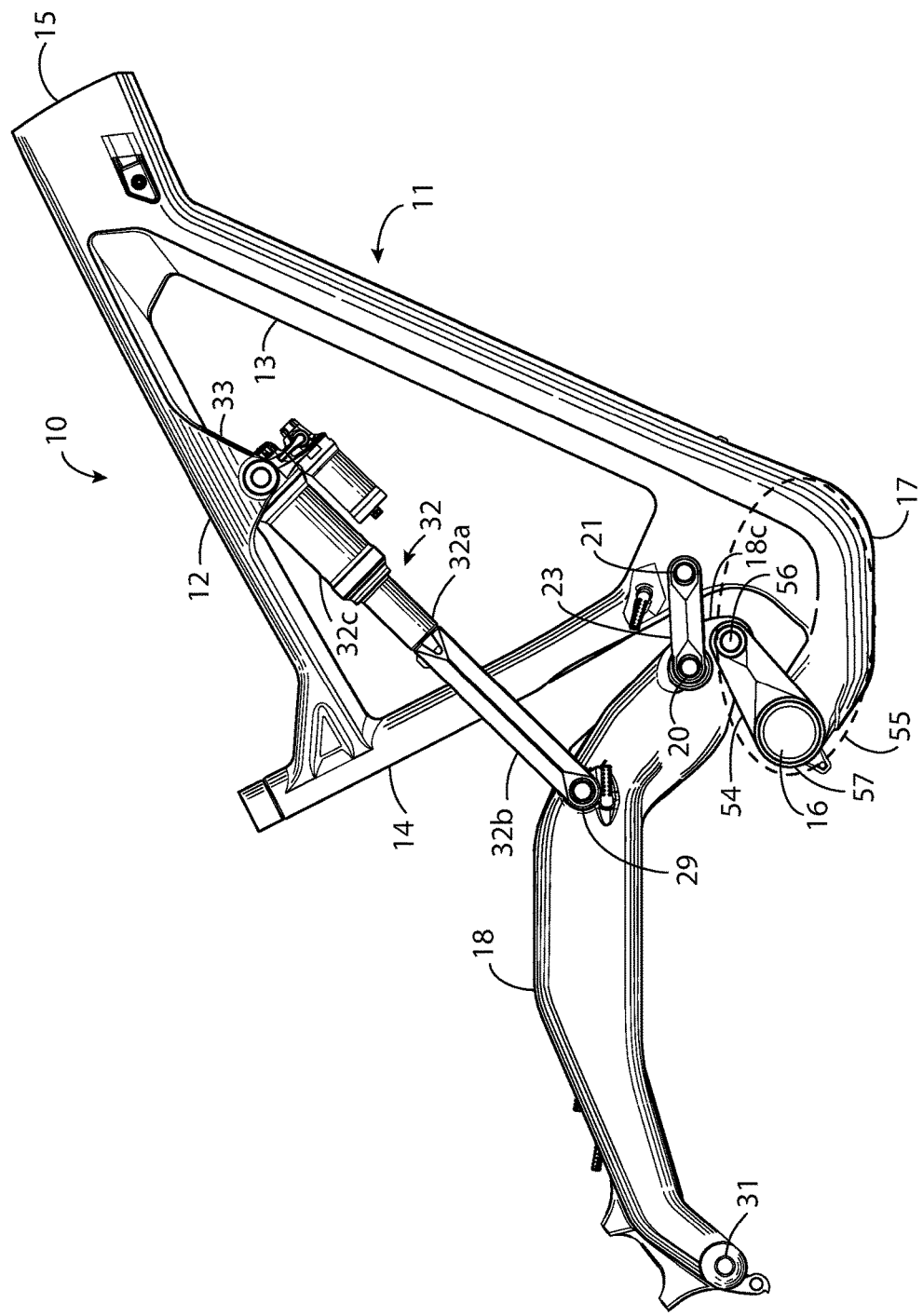
FIG. 8 illustrates a side elevation view of the suspension, the rear wheel and frame, a four-bar suspension utilizing the same principles of operation.

FIG. 8 illustrates a portion of a bicycle frame 10 or vehicle frame connecting the front portion of the vehicle, in this case a front triangle 11, to the rear portion of the vehicle, of which a swing arm 18 is illustrated, via a four-bar linkage. The four-bar linkage includes a link member 23 pivotally connected to the seat tube 14 proximate to a region where the seat tube 14 intersects the down tube 13 by a pivoting joint 21 to the swing arm 18 by a pivoting joint 20 on a portion of the swing arm 18 distal to the rear wheel drop out 31. A second link member 54 pivotally connects the swing arm 18 by a pivoting joint 56 to a pivoting joint 57 surrounding the bottom bracket 16. The pivoting joint 56 is shown located on the swing arm 18 below the pivoting joint 20 (i.e. closer to the first swing arm end 18c than pivoting joint 20). The pivoting joint 56 can be located proximate to the first swing arm end 18c as illustrated. Illustrated in broken lines is a driving device 55. This driving device 55 can be a motor, an electric motor, gear box that is connected to a motor or electric motor, or a combination of these with pedal and pedal arm. The driving device 55 can drive a rear wheel (not shown) that rotates about a rear axle connected to the rear wheel dropout 31 by a belt or chain. Note that the shape and position of the driving device 55 can be changed as required for the particular vehicle design. Alternatively, the crankset 37 of FIGS. 1-7 can readily be used in place of the driving device 55.

While developing this system, the inventor found that he could arrange the angles and of the pivoting joints and slider, and the positions of the pivoting joint and slider in relation to the frame elements, within a range where the drive loads generate an equal counter balance to the inertia loading that results in very little movement between the frame elements under acceleration of the drive and driven loads. This equipoise state between of drive and driven loads against the mass of the rider and inertia, while reaction against spring load of the rear wheel to trace the ground. Other systems, in contrast, require restriction of suspension movement during acceleration. This restriction in other systems severely damages the traction, safety, and suspension.

The inventor found that by these optimizations, the position the system could generate a sprung weight of the rider and inertia to move without restriction so that the rear wheel is free to move, tracing the ground tracing while supporting the inertia. The acceleration of the drive and driven loads on the mass of the rider/payload do not have large effect on the compression of the frame movement while staying is a free state of movement of tire tracing the ground. The action of imputing a drive load from pedaling or a motor, or electric motor, for example, into driven loads of the drive terrain (pedal) creates a "chain reaction" of events that alternate drive and driven loads resulting in frame structure creating an equipoise for the frame to be stable in acceleration. The system remains in a free moving state while the rear wheel traces the terrain, without hydraulic restriction, allowing the contact path of the bicycle, or other vehicle with the ground to not have further resistance beyond a spring rate increase. This also provides improved constant tire load between the ground and the vehicle.

The arrangement of link member(s) and sliding/pivoting joints (or only pivoting joints as in a pivoting four-bar), between the front portion of the vehicle, for example a bicycle front triangle, and the rear wheel connected swing arm remain in a state of free movement from terrain induced irregularities. While forces generated from acceleration are applied there is a counter balance of forces that resists a shift in movement between the front triangle and the rear wheel connected swing arm that is the result of the drive induced loads between member's forces being used to generate and offset of unwanted compression or elongation from the normal state or rest state of the bicycle.

This change in arrangement of pivot and sliding joint created dramatic and unexpected results. Typically, there is a compromise between suspension travel and acceleration. A bicycle using the inventor's new suspension system in confidential testing, has better performance acceleration performance than bicycles with half the suspension travel. For example, a bicycle using the inventor's suspension with 200 mm of suspension travel had better acceleration characteristics (i.e. is fastener) than racing or performance bicycles with 100 mm.

The inventor was able to create counterbalance of forces looking at four load conditions, optimizing the counterbalance of forces for each load condition, and taking the intersection of optimized conditions to create a vehicle that operates in an equipoise state under all four load conditions. In FIGS. 9 and 10, in blocks 101, 102, 103, 104, the inventor looked at drive/driven loads, acceleration forces, deceleration loads, and ground irregularities. The drive/driven loads parameter analyzes the basic kinematics of driving the structure. Deceleration loads parameters analyzes forced generated under deceleration such as braking forces. Ground irregularities analysis includes raised irregularities such as bumps, rocks, and logs, and depressions such as pot holes and ditches. In block 105, the inventor optimized the counterbalance of forces for each load condition, by analyzing the range of conditions, for a given four-bar arrangement and a given vehicle. Note that acceptable range of parameters will vary depend on the type of vehicle. For example, a downhill bicycle, a commuter bicycle, or an electric bicycle may have a different set of operating conditions and acceptable range of parameters. In block 106 the inventor took the intersection of each optimized condition (i.e. drive/driven load within structure, acceleration forces, deceleration forces, and ground irregularities) to create an equipoise state between the forces from the front and rear structure of the vehicle during acceleration, braking, and ground irregularities. One aspect of this analysis is the analysis effect of inertia on the acceleration and deceleration.

In FIG. 10, the equipoise load balance of block 106 takes into account the following conditions illustrated in block 107: ground tracing (i.e. the vehicle remains in contact with the terrain), load control on the rider (or human), a free state of movement for structure where a free state of movement is desirable, resistant state of movement for structure where a resistant state of movement is desirable, load control on ground contact, load control on sprung forces, load control on dampened forces, load control on inertial forces, load control on deceleration forces, and control over the vehicle geometry. Combined, this results in block 108 with human energy output goes into forward propulsion with equipoise control over the inertial forces that resist forward propulsion and resist deceleration during braking.

In one embodiment, the inventor found that he could optimize the balance of forces by arranging the angle created by the line between pivoting joints 20, 21 and the line between pivoting joint 21, 22 at approximately 90-degrees when the system was in a fully accelerated state or a rest state with a rider sitting at rest on the bicycle. In another embodiment, the optimization could take place by aligning the angle of the line along the length of the swing arm 18 proximate to the front triangle bottom portion and the primary load force line between the bottom bracket 16 and rear axle 43 at approximately 45 degrees with a range of +/−30 degrees. In addition, the angle of the link member 23 with the horizon could be 10 degrees+/−30 degrees. The inventor found when the system was configured for an equipoise state, the link member 23 will rotate equal or greater angle as compared the rotation of sliding link 19 on pivoting joint over the range of motion of the suspension. The inventor also observed that when the system was configured for an equipoise state, the link member 23 will rotate equal or greater angle as compared with the second link member 54 of FIG. 8.

Figure 11:
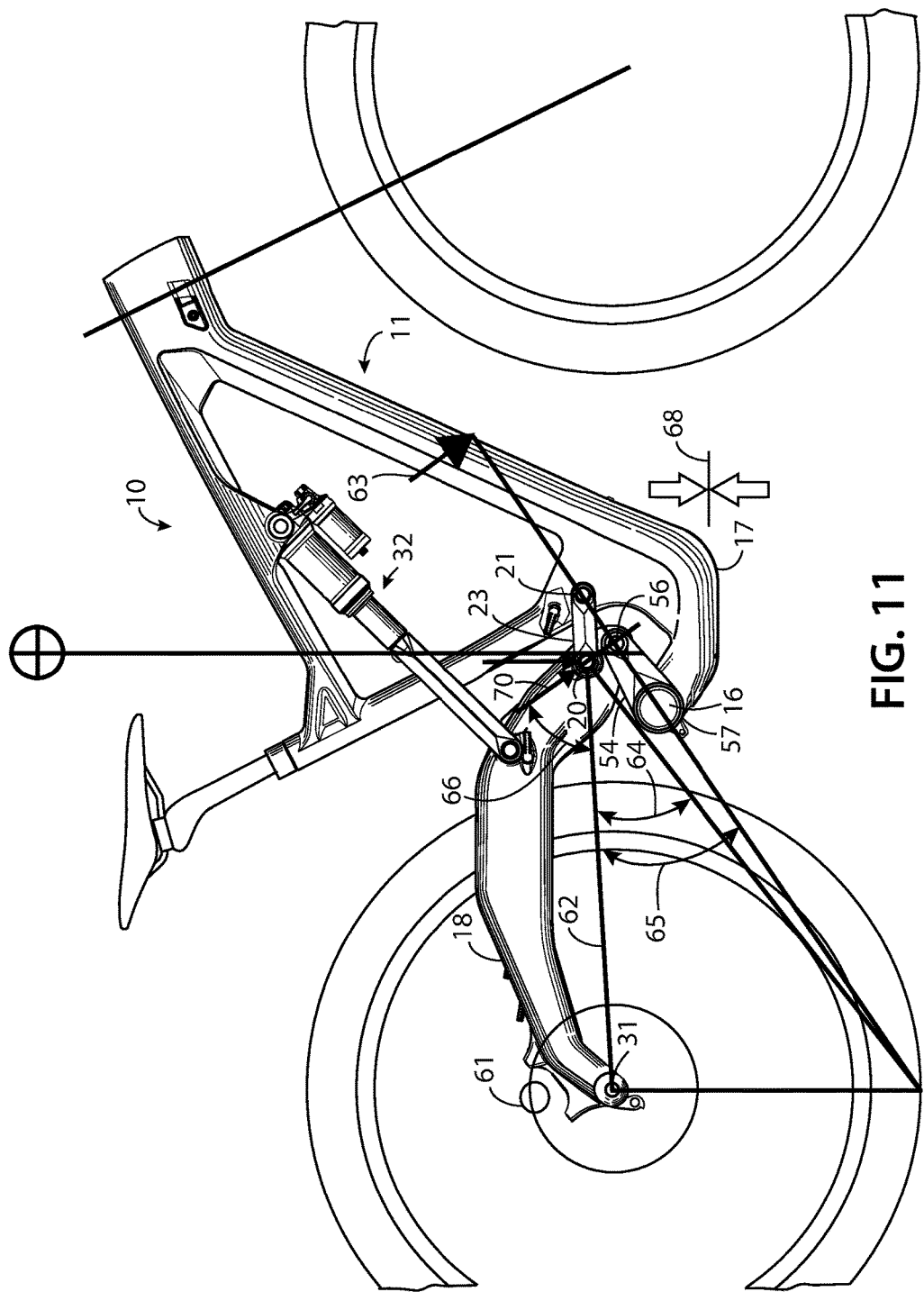
FIG. 11 illustrates optimizing for a parameter braking load paths between the front and rear portions of the vehicle of FIG. 8.
Figure 12:
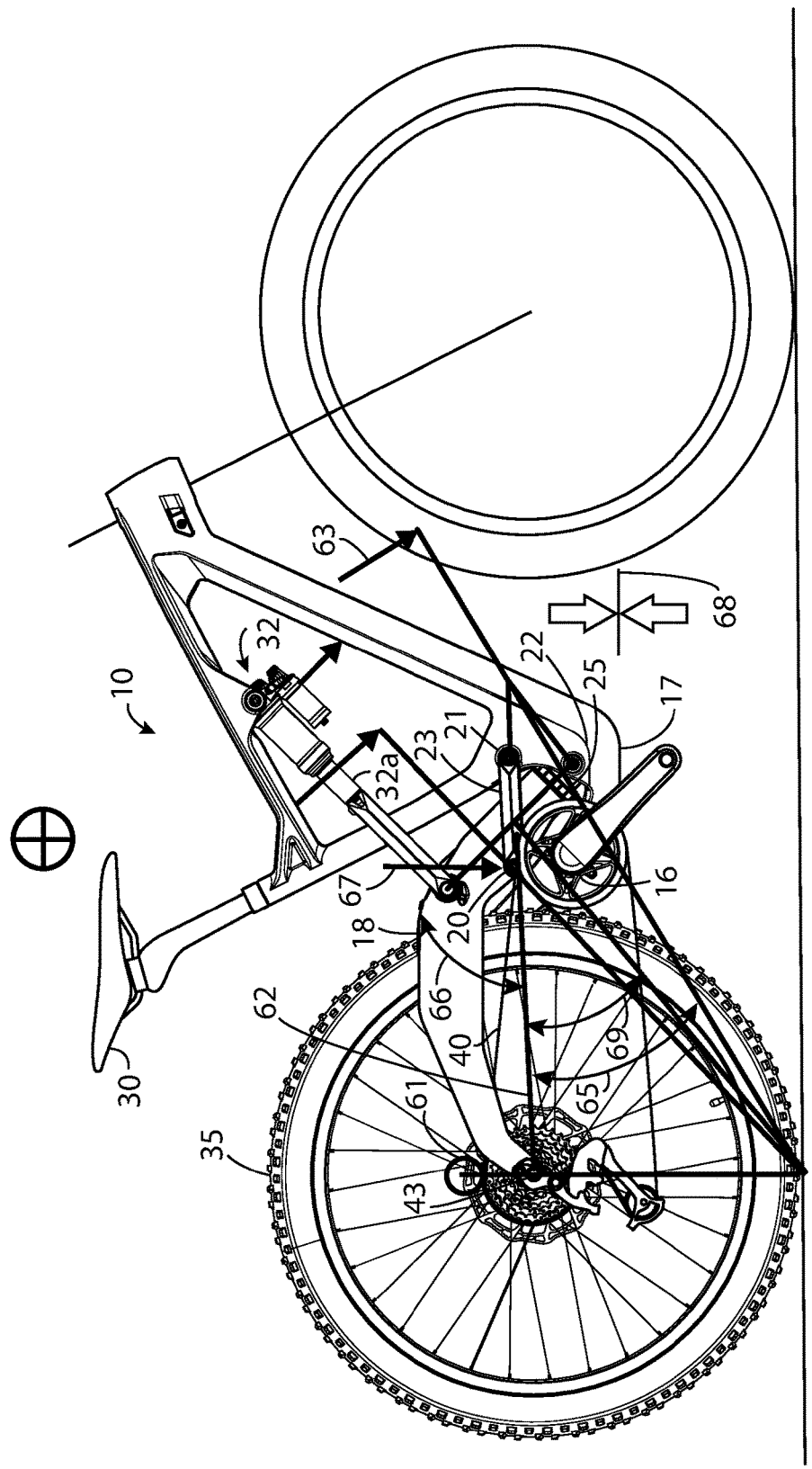
FIG. 12 illustrates optimizing for a parameter braking load paths between the front and rear portions of the vehicle of FIG. 5.
Figure 13:
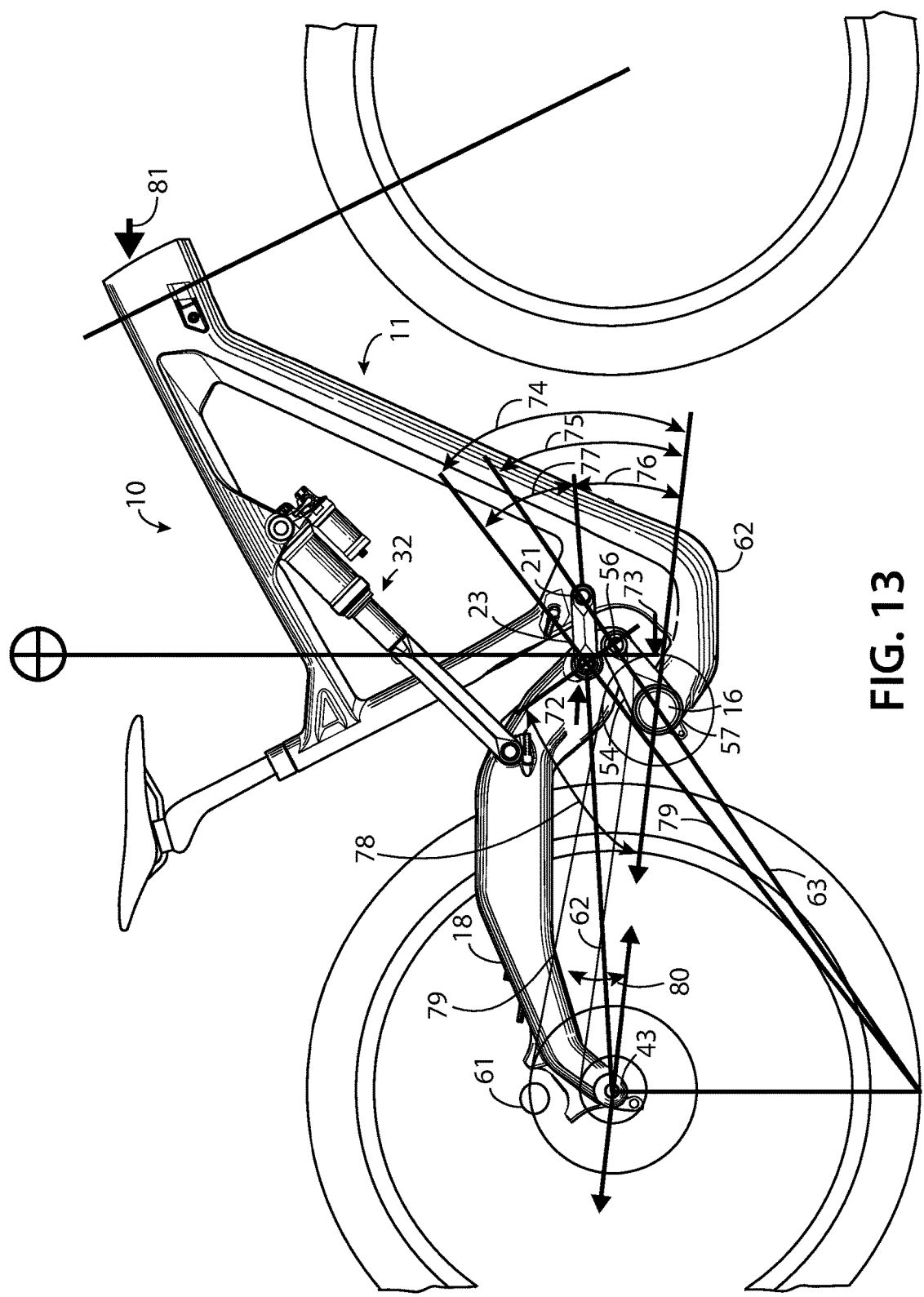
FIG. 13 illustrates optimizing for a parameter of drive and driven load paths between the front and rear portions of the vehicle of FIG. 8.
Figure 14:
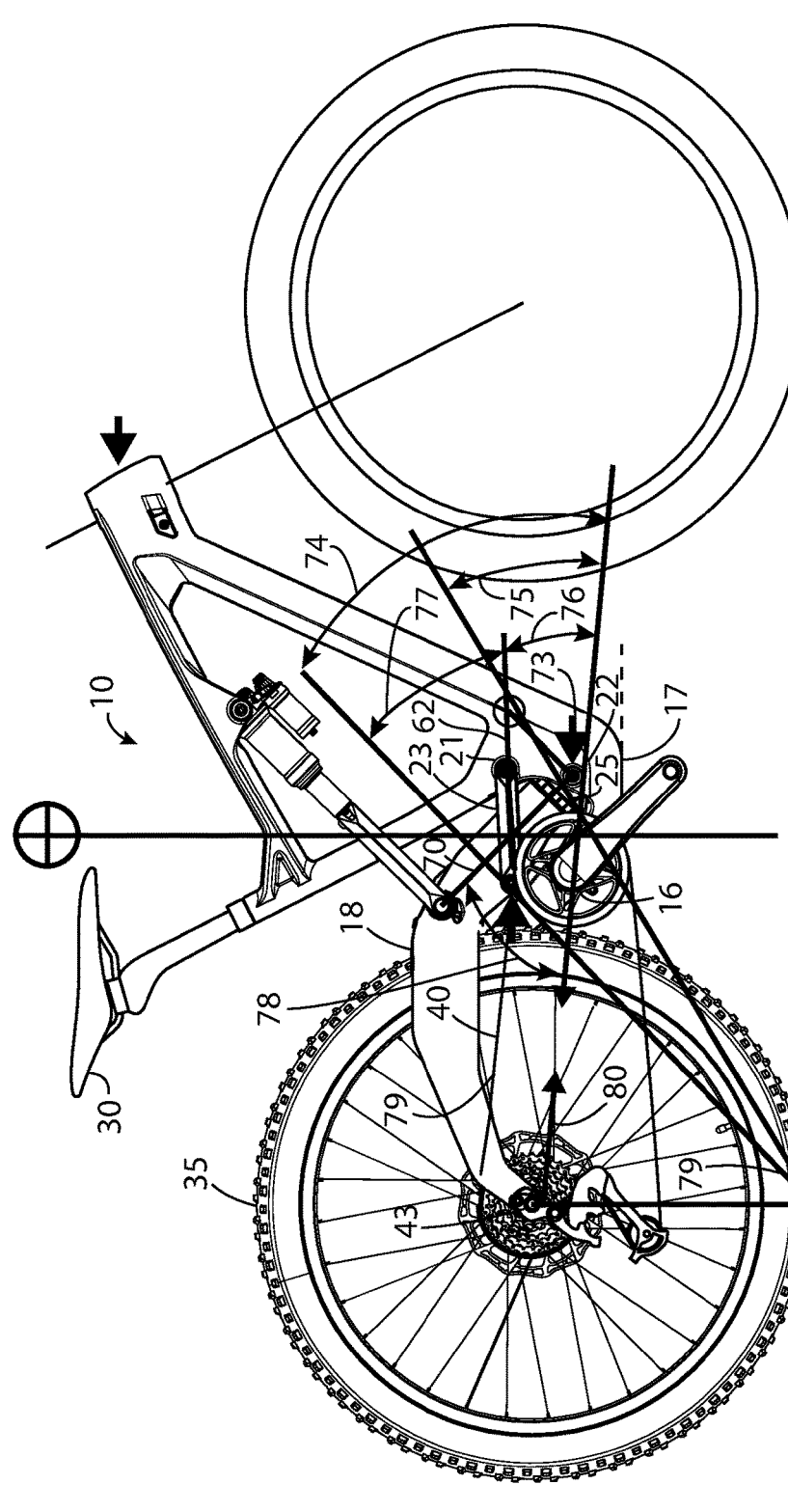
FIG. 14 illustrates optimizing for a parameter of drive and driven load paths between the front and rear portions of the vehicle of FIG. 5.
Figure 15:
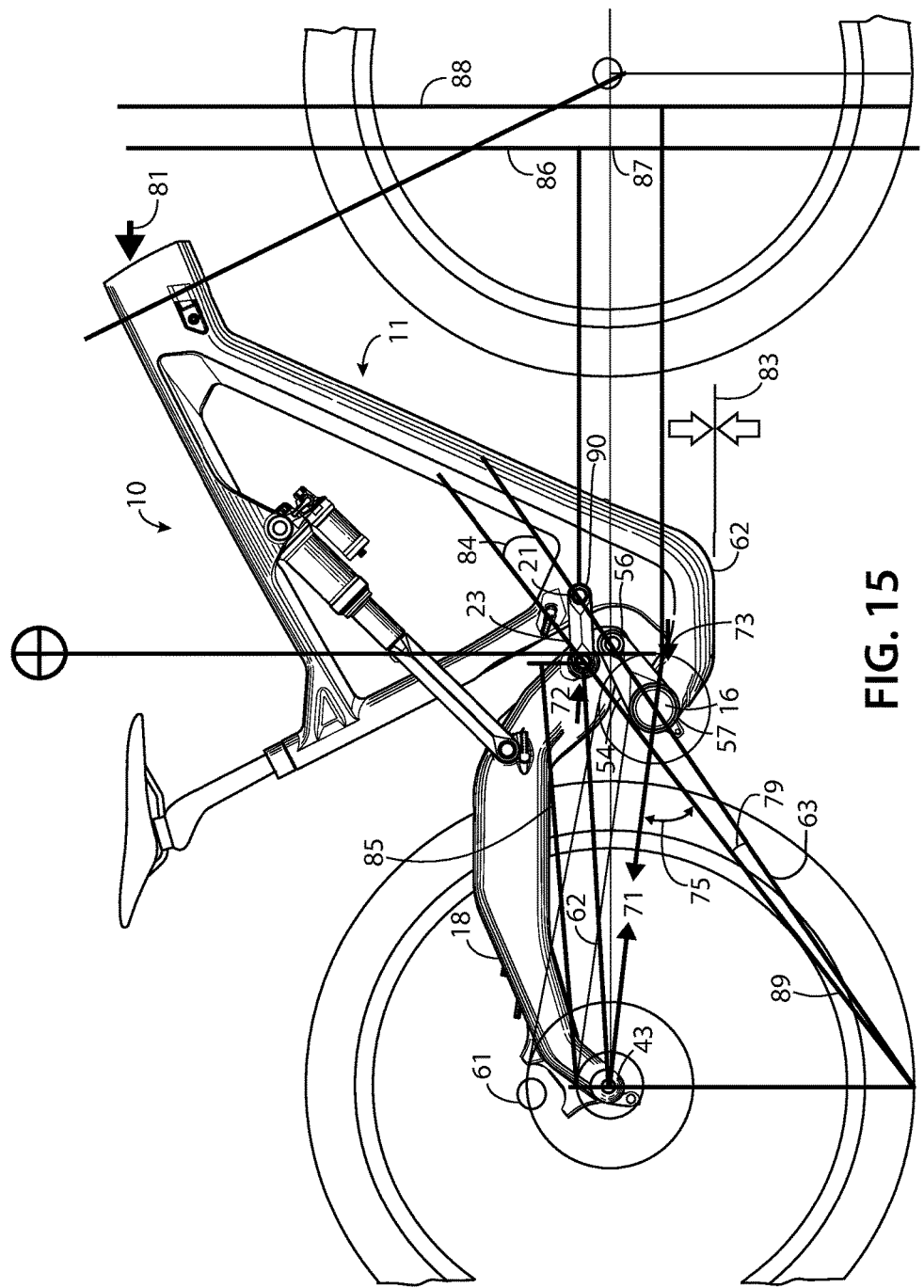
FIG. 15 illustrates optimizing for a parameter of the inertial forces between the front and rear of the vehicle of FIG. 8.
Figure 16:
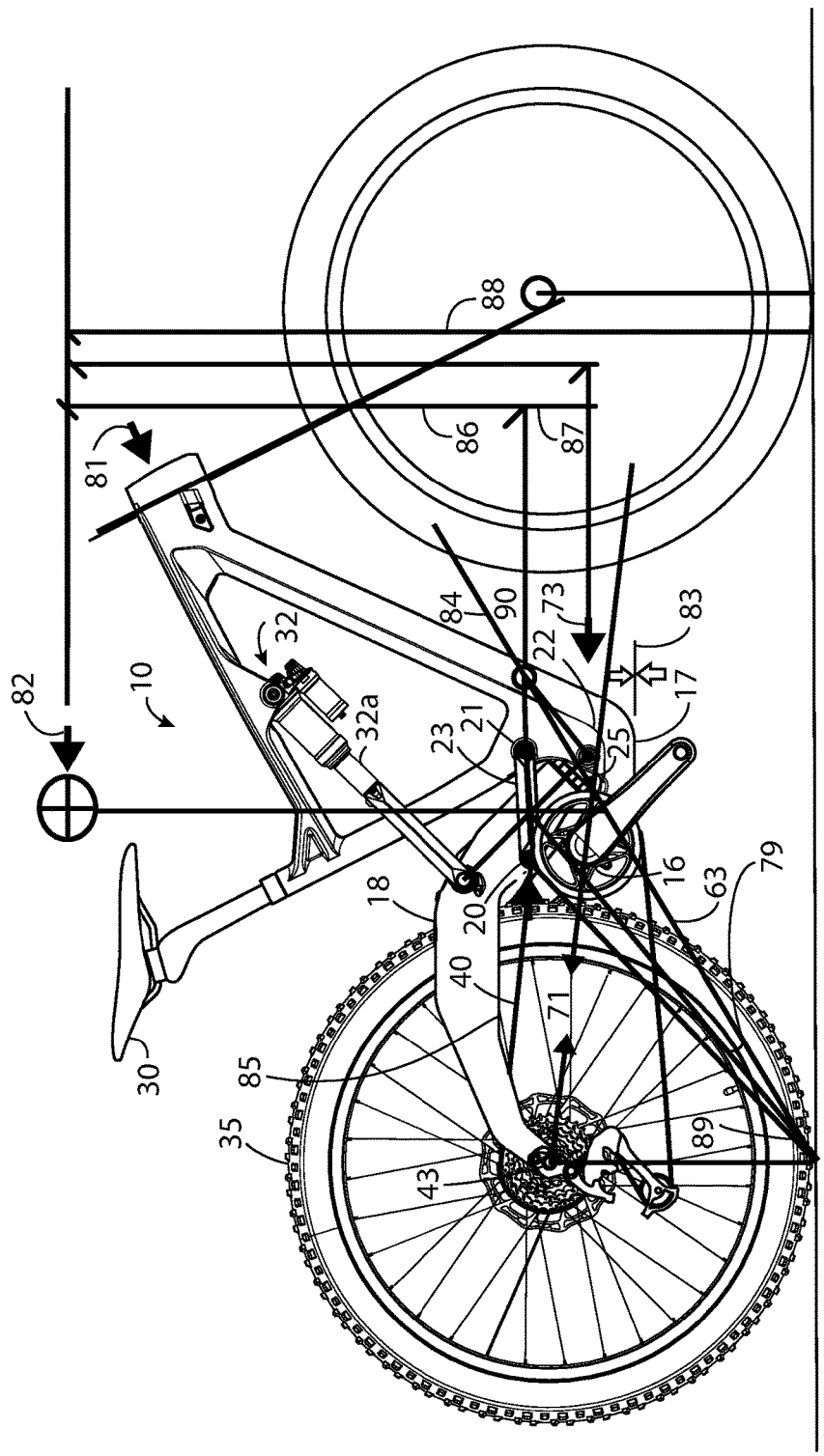
FIG. 16 illustrates optimizing for a parameter of the inertial forces between the front and rear of the vehicle of FIG. 5.
Figure 17:
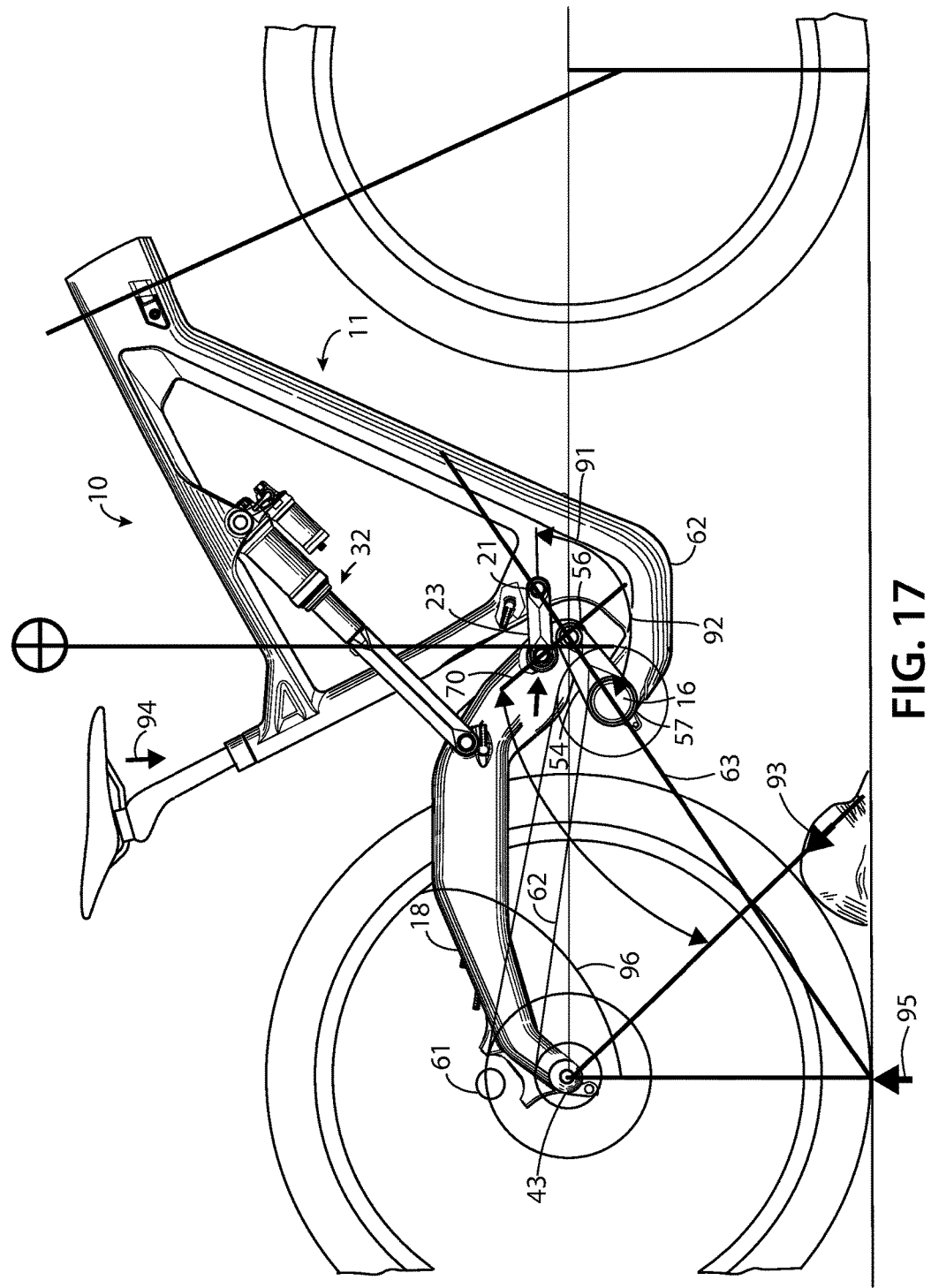
FIG. 17 illustrates optimizing for a parameter of downward and upward forces for ground tracing of the vehicle of FIG. 8.

FIGS. 11-18, demonstrate how an equipoise state through braking, acceleration, and at rest with the rider on the vehicle could be created while the vehicle maintains ground tracing, by individually optimizing four parameters. FIGS. 11, 13, 15, and 17 show the relationship of forces for each of four parameters for the vehicle component system of FIG. 8. FIGS. 12, 14, 16, and 18 show the relationship of forces for each of four parameters for the vehicle component system of FIGS. 1-7. FIG. 11 illustrates optimizing for a parameter braking load paths between the front and rear portions of the vehicle of FIG. 8. FIG. 12 illustrates optimizing for a parameter braking load paths between the front and rear portions of the vehicle of FIG. 5. FIG. 13 illustrates optimizing for a parameter of drive and driven load paths between the front and rear portions of the vehicle of FIG. 8. FIG. 14 illustrates optimizing for a parameter of drive and driven load paths between the front and rear portions of the vehicle of FIG. 5. FIG. 15 illustrates optimizing for a parameter of the inertial forces between the front and rear of the vehicle of FIG. 8. FIG. 16 illustrates optimizing for a parameter of the inertial forces between the front and rear of the vehicle of FIG. 5. FIG. 17 illustrates optimizing for a parameter of downward and upward forces for ground tracing of the vehicle of FIG. 8. FIG. 18 illustrates optimizing for a parameter of downward and upward forces for ground tracing of the vehicle of FIG. 5.

FIGS. 11 and 12 show the four-bar structure of FIG. 8 and FIG. 5 respectively with forces from a braking device 61, such as a disc brake, being applying forces through link member 23 and second link member 54 to the front triangle 11 of the bicycle frame 10. Load path 62 depicts the load between the rear axle 43 and the link member 23. Load path 63 depicts the generated load resulting from tire contact to ground and the generated load on members of the bicycle frame 10. The reactionary loads overlap the instant center 90 and pivoting joint 21 of the link member 23. Angle 64 depicts the angle of incidence between load path 62 and the path 70 resulting from the braking load between tire and ground on the ground tracing coupled position. path 70 represent a line of a plane of side of the four-bar system. Angle 65 depicts the angle between load path 62 and load path 63. Angle 66 represents the angle between the braking force along load path 62 and the brake force load along path 70. Equipoise state reference line 68 represents a state of equipoised conditioning on the bicycle frame 10 under load.

Referring to FIGS. 13 and 14, the drive and driven loads that are part of the kinematics that make up the movements of the relationships of the main vehicle structure and the rear ground tracing frame member. The movement of the frame members are derived partly from the coupled location and coupling manner as the loads from the drive and driven elements are applied. The loads generated to vehicle from the drive and driven forces generate a driven forces 71 as the vehicle maintains, climbs, accelerates or has external resistance to forward propulsion. Load path 72 depicts the acceleration force between the swing arm 18 (i.e. the ground tracing element) through the pivoting joint 21 the pivotally couples the link member 23 into front triangle 11. The link member 23 generally takes the primary compression force of the drive and driven loads. Load force vector 73 depicts a load force direction resulting from the driven forces 71 onto the front frame member. Angle 74 depicts a changing angle based on a state of relationship between the front triangle 11 and swing arm 18. Angle 74 relates the pivoting joint 21 and the orientation in one state of freedom within the total movement based on relationship change to the drive and driven load of the driven forces 71. Angle 75 depicts the relationship between the instant center of rotation or equitant rotational point that the drive and driven loads act on from the driven forces 71. Angle 76 shows the relationship of the link member 23 and relational values of force and angle change to the vehicle. They depict a shift in load values as well as how it relates to generating a state of equipoise between the front triangle 11 and the swing arm 18. In this state of sag, the pivoting joint 57 of the second link member in FIG. 8 or the pivoting joint 22 in FIG. 5, provide the majority of the equipoise state of balance between front triangle 11 and the swing arm 18 as the driven loads react on the mass of bicycle.

Angle 77 represents the drive and driven loads on pivoting joint 21 and the link member 23. As depicted, the angle 77 is based on sag position between front triangle 11 and the swing arm 18. If pivoting joint 21 is not on the center line of the link member 23 that a point of instant force will translate a relative path of force to this shifting axis throughout the center line of axis as a relationship change of front triangle 11 and swing arm 18 takes place.

Angle 78 represents the relational angles between the compression force 71 and path 70 between the front triangle 11 and the swing arm 18. Angle 79 depicts the relative chain angle between the small gear and the largest rear gear. The drive and driven force on gearing angles will generate a force of incident based on loads that generate further influence of drive forces generally depicted on the compression forces 71. Shown as a range of drive and driven loads of Angle 79 will have an effect on compression forces 71 force values based and the influence of angle 80. Furthermore, the range of gear and force values of the drive and driven loads with have associated values of influence between the front triangle 11 and the swing arm 18 on various load force condition. Arrow 81 depicts the mass of vehicle as it related to the drive and driven forces of the vehicle. Referring to FIG. 13, reference line 69 depicts the contact between tire and ground with the braking force line of 63 in relationship to the braking force line of path 70.

Referring to FIGS. 15 and 16, the acceleration loads on the bicycle frame 10 from the drive and driven loads are used to generate a proactive state of equipoise on acceleration of vehicle. Reference line 83 symbolizes the equipoise throughout a range of movement between front triangle 11 and the swing arm 18. There are inherent force values result from the state of relationship of the front triangle 11 and the swing arm 18 that amount to influencing gravitational and inertia loads on the center of mass 82, the payload, and the vehicle, the force 94 from above the front triangle 11 have an effect of force on the center of mass 82 and as well as the other direction. The center of mass 82 represent a value of mass that should be further expressed in general conditioning that have relational shifts in position value between center of mass 82 and the vehicle based on the position of human/payload mass to vehicle structure as well the freedom of movements of the entire system. The influence of center of mass 82 on the kinematics and corresponding geometry of frame members within the system of 10 generate a wide range of shift to generate an equipoise state of balance on acceleration of the drive and driven loads of the forward propulsions. In the normal state of the art, the drive and driven forces on inertia of center of mass 82 have generally been misunderstood within the application of load path 72 on the vehicle and more focused towards the center of mass 82. Angle 84 depicts a relational value of leverage between the coupling between front triangle 11 and the swing arm 18 and force line 85 that can be altered in relational values based on the application of use. A shift in one of more of the primary applications of use will generate a shift in relationship needs to match the functional output. Reference line 86 represents a vertical relational position of the center of mass 82, driven load, and drive load (on the load path 72), as it reacts on general acceleration loads of the ground tracing and drive element of the system that extends from the instant center 90 of rotation to the region of mass. Reference line 87 represents the vertical relation of the drive and driven forces 71 as they act on front triangle 11 with a generated leverage on instant center 90. Reference line 88 represents the general vertical distance in one of the states of sitting or standing of center of mass 82 above the ground 67. Angle 89 represents the angle contact between the ground 67 and the rear wheel 35 and instant center of force on that resides between movement of link member 23 as it translates to path 70. Instant center 90 represents the instant center of rotation that is translated from the movement between front triangle and the swing arm 18 as the centerlines of the link member 23 and load path 63.

In FIG. 18 an instant center 90 between the center line of link member 23 a line through pivoting joint 22 at 90-degrees to the path 70 (i.e. sliding member center line in FIG. 18). In FIGS. 17 and 18, angle 91 depicts the movement relation of path 70 and link member 23 in the current state of sag. Angle 91 represents a relational shift between the front triangle 11 and the swing arm 18. In FIG. 17 angle 92 depicts the value between load path 63 and path 70 as translated in the shift. The relational values of angle 91 and angle 92 depict the freedom to translate in one direction of desire while generating a restriction movement in another. The restriction of movement will support an equipoise state reference line 68 of sprung resistance while in another force will generate freedom of movement with ground tracing over verity forces derived from movement of vehicle and the obstruction as shown object 93 that are in the path of vehicle. As the movement increases between the front triangle 11 and swing arm 18 there will be a rate resistance from force of direction and rate of spring and rate of damping. The relational values of angle 91 and angle 92 move with one another to generate a force of value reflective. The relational value between path 70 and angle 97 will change in value with range of shift. The shift in value generate a force of influence that creates a freedom of movement over object 93 within a wide range of movement between front triangle 11 and the swing arm 18 that react against 94. 94 represent the mass value of the human/payload and vehicle that are generally above the structure of vehicle. Force arrow 95 depicts the force of the ground upon the rear wheel 35 and the swing arm 18. Angle 96 represents the angle of influence of force arrow 95 upon path 70. Angle 97 depicts the force angle that results from the swing arm 18 being able to move freely over an object 93 translating into movement of the swing arm 18 in relationship to the front triangle 11. The object 93 can represent a typical obstacle, for example, a rock, log, or other obstacle.

The remainder of the specification may be viewed as being utterly distinct from or, alternatively, as complementary to the preceding disclosure.

The present disclosure relates to a vehicle component. The vehicle component may be a(n individual) component that transfers (at least part of) a gravitational force acting on a payload of a vehicle to at least one (propulsive) element that interacts with an ambient environment of the vehicle, e.g. for the sake of providing a propulsive force and/or for the sake of allowing the vehicle to glide/roll over an ambient surface. Similarly, the vehicle component may be a system (of interacting elements), which system transfers (at least part of) a gravitational force acting on a payload of a vehicle to at least one (propulsive) element that interacts with an ambient environment of the vehicle, e.g. for the sake of providing a propulsive force and/or for the sake of allowing the vehicle to glide/roll over an ambient surface. As such, the vehicle component may be termed a "vehicle frame" or a "vehicle frame component". The payload may include a driver, a rider and/or a passenger of the vehicle. The payload may include an inanimate payload. The ambient surface may be terrain. Similarly, the ambient surface may be a water surface, e.g. a surface of a body of water. The (propulsive) element may be a terrain-engaging element, e.g. a terrain-engaging element selected from the group consisting of a wheel, a skid, a ski and a (continuous) track. Similarly, the (propulsive) element may be a marine (propulsion) element, e.g. an element selected from the group consisting of a float, a hull, a water ski, a jet nozzle and a propeller. For the sake of conciseness, the term "terrain-engaging element" will be used hereinafter to designate any (propulsive) element as described hereinabove, regardless of whether such element is a marine element. (An elucidation of the term "any" is given in the closing paragraphs of this specification.)

The present disclosure likewise relates to a vehicle comprising the vehicle component. The vehicle may comprise at least one terrain-engaging element as described above. The vehicle may be a vehicle selected from the group consisting of a bicycle, an e-bike, a motorcycle, a moped, a (terrestrial) rover, a snowmobile, a snow scooter and a (personal) watercraft. As such, the vehicle may be a vehicle selected from the group consisting of a human-powered vehicle, a (gasoline and/or electric) motor-powered vehicle and a vehicle powered by both human and (gasoline and/or electric) motor power. In the context of the present disclosure, the term "e-bike" may be understood as a bicycle comprising an electrically powered motor that contributes a driving force to at least one wheel of the bicycle.

As evidenced by the remarks above, the specialized nomenclature typically associated with the various vehicles to which the inventive principles of the present disclosure are applicable impairs both the conciseness and overall readability of the present disclosure. Accordingly, the remainder of this disclosure will, in general, use the nomenclature of a bicycle as a contextual basis for the disclosure. This use of bicycle nomenclature is not intended to exclude other types of vehicles from the scope of that disclosure. Instead, it is trusted that the reader can easily transfer the concepts disclosed herein in the context of a bicycle to other vehicles without inventive skills. Accordingly, the following disclosure will also include occasional references to other types of vehicles to aid the read in understanding how the disclosed teachings may be applied to vehicles other than bicycles.

The vehicle component may comprise a first frame portion and a second frame portion. The first frame portion may define a first rotational axis, e.g. a rotational axis of a driving sprocket (as opposed to a driven sprocket). For example, the first rotational axis may be a rotational axis of a bottom bracket.

The first rotational axis may be located in a lower portion of the first frame portion, e.g. in a lowermost 30%, a lowermost 20%, a lowermost 10% or a lowermost 5% of the first frame portion. (The terms "lower" and "lowermost" are described in further detail infra.) Similarly, the first rotational axis may be located in a rearward portion of the first frame portion, e.g. in a most rearward 30%, a most rearward 20%, a most rearward 10% or a most rearward 5% of (the aforementioned lower(most) portion of) the first frame portion. (The term "rearward" is described in further detail infra.) Similarly, the second frame portion may define a second rotational axis, e.g. a rotational axis of a driven sprocket. For example, the second rotational axis may be a rotational axis of a (second/rear) wheel. Similarly, the second rotational axis may be a (rearmost) rotational axis of a guide of a (continuous) track. The second rotational axis may be located in a rearward portion of the second frame portion, e.g. in a most rearward 30%, a most rearward 20%, a most rearward 10% or a most rearward 5% of the second frame portion. Similarly, the second rotational axis may be located in a lower portion of the second frame portion, e.g. in a lowermost 30%, a lowermost 20%, a lowermost 10% or a lowermost 5% of (the aforementioned (most) rearward portion of) the second frame portion. The vehicle component may comprise at least one (steel, aluminum and/or carbon fiber) tube and/or at least one (steel, aluminum and/or carbon fiber) beam. As such, at least 80%, at least 90% or (substantially) an entirety of the first/second frame portion (by volume and/or by weight) may be a material selected from the group consisting of steel, aluminum and carbon fiber. For example, an entirety of the first/second frame portion may be of such a material except bushings and/or thread elements, e.g. for interconnecting the first/second frame portion with other structures of the vehicle. Such bushings and/or thread elements may demand wear characteristics and/or machining tolerances not achievable with aluminum or carbon fiber.

The first frame portion may constitute a more forward portion of the vehicle component than the second portion. In the present disclosure, "forward" and/or "rear" (as well as related terms such as fore, aft, front and back) may be defined, as known in the art, by an orientation and/or location of a steering wheel and/or handlebars and/or an orientation and/or location of seats (of the vehicle) relative to the vehicle component. Similarly, "forward" and/or "rear" (and related terms) may be defined, as known in the art, by (other) characteristics of the vehicle component and/or a vehicle comprising the vehicle component. Such characteristics may include a shape of a chassis, a configuration of a drivetrain, etc. For example, the seat may be "forward" of a propulsive terrain-engaging element. A (dominant) direction of propulsion and/or motion of the vehicle may be a "forward" direction. (For the sake of conciseness, the term "propulsion direction" will be used hereinafter to designate the (dominant) direction of the vehicle regardless of whether the vehicle comprises a motor or other means of propulsion). In the present disclosure, "forward" and/or "rear" (and related terms) may designate a (relative) location with respect a "horizontal" axis (when the vehicle is on level terrain). Such designation may be independent of a "vertical" location, i.e. is not to be invariably construed as implying a "vertical" location.

In the present disclosure, "upward" and/or "downward" (as well as related terms such as above, below, upper, higher and lower) may be defined, as known in the art, by an orientation and/or location of seats (of a vehicle) relative to the vehicle component and/or a location of a steering wheel and/or handlebars relative to a seat (of the vehicle). Similarly, "upward" and/or "downward" (and related terms) may be defined, as known in the art, by (other) characteristics of the vehicle component and/or a vehicle comprising the vehicle component. Such characteristics may include a shape of a chassis, a configuration of a drivetrain, a location of at least one terrain-engaging element as described above, etc. In the present disclosure, "upward" and/or "downward" (and related terms) may designate a (relative) location with respect a "vertical" axis (when the vehicle is on level terrain). Such designation may be independent of a "horizontal" location, i.e. is not to be invariably construed as implying a "horizontal" location.

In the nomenclature of a bicycle, the first frame portion may comprise a seat tube, a top tube, a head tube and a down tube. The first frame portion may have the shape of a quadrilateral. The seat tube, top tube, head tube and down tube may constitute the four sides of the quadrilateral. Similarly, the first frame portion may have the shape of a partial quadrilateral. The seat tube may rigidly connect the top tube and the down tube. The seat tube, top tube, head tube and down tube may constitute the four sides of the partial quadrilateral, the seat tube being (rigidly) connected to the top tube, but (a lower portion of the seat tube being) not (rigidly) connected to the down tube. In such a configuration, the top tube, head tube and down tube may (collectively) act as a spring. The first frame portion may furthermore comprise a front fork, a steering tube of the front fork being rotatably mounted in the head tube. The first frame portion may comprise a bottom bracket. The bottom bracket may be located proximate to and/or rearward of a(n imaginary) junction of the down tube and the seat tube. The first frame portion may comprise comprises a top tube, a bottom bracket region and a seat tube that rigidly connects the top tube and the bottom bracket region.

The second frame portion may comprise/consist (substantially) of a (rear) fork, e.g. a (rear) fork that supports a (rear) wheel of the vehicle. The fork may comprise/consist (substantially) of a first arm, a second arm and a yoke portion. Each of the first and second arms may comprise a dropout, opening or bore (in a rearmost 10% of the respective arm) that receives a (respective) end of an axle (of the wheel). The first and second arms, e.g. the dropouts, openings or bores thereof, may define (a position of) the second rotational axis. The yoke portion may interconnect the first and second arms (at a (respective) forward portion of each of the first and second arms). The fork may comprise a space between the first and second arms that accommodates a (forward) portion of the (rear) wheel (as known in the art). The fork may be a monolithic/unitary structure. The fork may be termed a "swingarm".

The vehicle may comprise at least one seat, e.g. for at least one user selected from the group consisting of a driver, a rider and a passenger of the vehicle. The seat may be mounted on/rigidly connected to the first frame portion. The seat may lack connection to the second frame portion except via the first frame portion. The seat may be connected to the first frame portion via the seat tube.

The vehicle may comprise a (power conversion) mechanism for converting (leg and/or arm) motion of a user/rider into mechanical power. The mechanism may comprise a (driving) sprocket. The mechanism may comprise a crankset (that comprises the sprocket) and/or (pivotally mounted) levers (that drive the sprocket). The mechanism may be mounted on the first frame portion, e.g. via the bottom bracket.

The vehicle may comprise a drivetrain, e.g. for transmitting a driving force from the (power conversion) mechanism/the (driving) sprocket to (a driven sprocket connected to) at least one terrain-engaging element (mounted on the second frame portion) of the vehicle. The drivetrain may comprise a chain and/or a belt.

The vehicle may comprise a (gasoline and/or electric) motor. The motor may be located in a lower and/or rearward portion of the first frame portion as described supra. The motor may contribute a driving force to at least one terrain-engaging element of the vehicle, e.g. via the drivetrain. The motor may be mounted on the first frame portion. The drivetrain may transmit a driving force from the motor (mounted on the first frame portion) to (a driven sprocket connected to) at least one terrain-engaging element (mounted on the second frame portion) of the vehicle. Similarly, the motor may be mounted on the second frame portion and provide a driving force to at least one terrain-engaging element mounted on the second frame portion.

The vehicle component may comprise a linkage, e.g. a linkage that movably connects the first frame portion and the second frame portion. As such, the linkage may connect the first frame portion and the second frame portion such that the first frame portion is movable (within a limited range of motion defined by the linkage) relative to the second frame portion (and vice versa). The linkage may connect to a lower and/or rearward portion of the first frame portion as described supra.

The linkage may be a four-bar linkage. Similarly, the linkage may form a four-bar linkage in conjunction with at least one element of the first and/or second frame portion. (Hereinafter, the term "linkage" will often be used without distinguishing whether the linkage involves elements of the first/second frame portion. In cases where such ambiguity is inappropriate, it is trusted that such ambiguity will be dispelled by the context.)

In the present disclosure, (minimum) distances, (acute) angles, relative positions, etc. that may depend on a state of the linkage may be (narrowly) understood as being valid (i.e. measured/determined) when the vehicle is (in an unladen, neutral state) on a level surface (with the terrain-engaging elements of the vehicle contacting the level surface). Moreover, such distances, angles, relative positions, etc. may also be understood as being valid at a mid-range position of the linkage, e.g. rotationally halfway between a first end of range position and a second end of range position of the linkage. Furthermore, such distances, angles, relative loca-tions, etc. may also be broadly understood as being valid throughout the entire operating range of the linkage.

The linkage may comprise a slide link. The slide link may comprise a barrel and a piston (that slides at least partially within the barrel). The barrel may comprise a (circular) cylindrical inner wall. The piston may slide within the barrel along a (linear) slide axis. The piston may comprise a (circular) cylindrical outer wall, e.g. a cylindrical outer wall that (within tolerances as known in the art) matches (the dimensions of) the cylindrical inner wall of the barrel. The cylindrical outer wall of the piston may have a length of at least 10%, at least 20% or at least 30% of a length of the cylindrical inner wall of the barrel. The cylindrical outer wall of the piston may have a length of at most 40%, at most 30% or at most 20% of a length of the cylindrical inner wall of the barrel. The cylindrical outer wall of the piston may have a length of at least 5 cm or of at least 10 cm. The cylindrical outer wall of the piston may have a length of at most 10 cm or at most 20 cm. The length of the cylindrical outer wall of the piston and/or cylindrical inner wall of the barrel may be measured parallel to the slide axis. The cylindrical inner wall of the barrel may have a minimum dimension of at least 5 cm, at least 8 or at least 10 cm, e.g. as measured perpendicular to the slide axis (at the respective location). The cylindrical inner wall of the barrel may have a maximum dimension of at most 15 cm, at most 12 cm or at most 10 cm, e.g. as measured perpendicular to the slide axis (at the respective location). At least 80%, at least 90% or (substantially) an entirety of the slide link (by volume and/or by weight) may be a material selected from the group consisting of steel, aluminum and carbon fiber. Similarly, at least 80%, at least 90% or (substantially) an entirety of the barrel (by volume and/or by weight) may be a material selected from the group consisting of steel, aluminum and carbon fiber and at least 80%, at least 90% or (substantially) an entirety of the piston (by volume and/or by weight) may be a material selected from the group consisting of steel, aluminum and carbon fiber. The slide link may slidingly engage the second frame portion (along the slide axis). The barrel may be an element of the second frame portion. Similarly, the piston may be an element of the second frame portion. The slide link may be pivotally connected to the first frame portion, e.g. at a pivot axis forward of the bottom bracket and/or at a pivot axis located in a lower and/or rearward portion of the first frame portion as described supra. For example, the slide link may be pivotally connected to the first frame portion at a pivot axis proximate to and/or rearward of and/or below a(n imaginary) junction of the down tube and the seat tube. A (minimum) distance from the pivot axis (at which the slide link is pivotally connected to the first frame portion) to the head tube may be less than a (minimum) distance from the first rotational axis to the head tube. A length of the slide link, e.g. a distance between a first connection point (on/fixed relative to the barrel) and a second connection point (on/fixed relative to the piston) of the slide link, may be dependent on a state of the slide link, e.g. on a position of the piston relative to the barrel.

The vehicle component may be configured such that an acute angle between the slide axis of the slide link and an imaginary straight line coaxial with a driving segment of a chain/belt of the drivetrain is in the range of 10° to 60°, e.g. in the range of 20° to 50°. The vehicle component may be configured such that an acute angle between the slide axis of the slide link and an imaginary straight line through the first and second rotational axes is in the range of 20° to 60°. The slide link may be configured such that the slide axis slopes downwardly to the front. In other words, a rearward portion of the slide link/slide axis is higher than a forward portion of the slide link/slide axis.

The linkage may comprise at least one rigid link. The rigid link may be "rigid" in the sense that the link does not (substantially) change its shape under compression and/or tension (under normal use, e.g. when the rigid link transfers (typical) forces between the first and second frame portions). The rigid link may exhibit a fixed length between a first connection point and a second connection point of the rigid link. The rigid link may be a (flat) bar. The rigid link may have a length, e.g. as measured between the first connection point and the second connection point, of at least 8 cm, at least 10 cm, at least 15 cm or at least 20 cm. Similarly, the rigid link may have a length of at most 30 cm, at most 25 cm, at most 20 cm or at most 15 cm. The rigid link may have a minimum dimension and/or a thickness of at least 2 mm, at least 4 mm or at least 6 mm. Similarly, the rigid link may have a minimum dimension and/or a thickness of at most 10 mm, at most 6 mm or at most 4 mm. The thickness may be measured in a direction perpendicular to a major surface of the rigid link. The rigid link may be a material selected from the group consisting of steel, aluminum and carbon fiber. The rigid link may interconnect the first frame portion and the second frame portion, e.g. via respective pivotal connections at the first and second connection points. The rigid link may be pivotally connected to the first frame portion, e.g. (exclusively) at the first connection point (that defines a first pivot point/a first pivot axis). The rigid link may be pivotally connected to the second frame portion, e.g. (exclusively) at the second connection point (that defines a second pivot point/a second pivot axis). The rigid link may be pivotally connected to the second frame portion at a location on (a rearward/forward side of) the barrel of the slide link. The linkage may comprise a pair of (parallel and/or mirror image) rigid links. Each rigid link of the pair may be pivotally connected to the first frame portion, e.g. (exclusively) at a first pivot axis. Each rigid link of the pair may be pivotally connected to the second frame portion, e.g. (exclusively) at a second pivot axis. The rigid link may have an "X"-like or an "H"-like shape. Two arms of the ("X"/ "H"-shaped) rigid link may be pivotally connected to the first frame portion at a first pivot axis. Two other arms of the ("X"/"H"-shaped) rigid link may be pivotally connected to the second frame portion at a second pivot axis. At least one of the first pivot axis and the second pivot axis may be perpendicular to the propulsion direction. At least one of the first pivot axis and the second pivot axis may be parallel to the terrain when the vehicle is on level terrain.

The rigid link may be a rocker link, e.g. a rocker link having a first connection point, a second connection point and a third connection point. The first connection point may be located intermediate the second connection point and the third connection point. The rocker link may exhibit a fixed length between the first connection point and the second connection point. Similarly, the rocker link may exhibit a fixed length between the first connection point and the third connection point. The rocker link may be configured such that an acute angle between an imaginary straight line through the first and second connection points and an imaginary straight line through the first and third connection points is in the range of 0° to 45°, e.g. in the range of 10° to 40°. The rocker link may be pivotally connected to the first frame portion, e.g. at the first and third connection points. The rigid link may be pivotally connected to the second frame portion, e.g. at the second connection point. In the case of a bicycle, for example, the third connection point of the rocker link may pivotally connect to a downward end of the seat tube of the first frame portion and the first connection point of the rocker link may pivotally connect to (an upward side of) a bottom bracket region of the first frame portion. The linkage may comprise a pair of (parallel and/or identical) rocker links. Each rocker link of the pair may be pivotally connected to the first frame portion, e.g. at a first pivot axis and a third pivot axis. Each rocker link of the pair may be pivotally connected to the second frame portion, e.g. at a second pivot axis.

The first frame portion may comprise at least one (cylindrical) bushing. The rigid link may be pivotally connected to the first frame portion by a pin, bolt or other fastener that extends through the bushing and through the rigid link at the first/third connection point, e.g. along the first/third pivot axis. Similarly, the second frame portion may comprise at least one (cylindrical) bushing. The rigid link may be pivotally connected to the second frame portion by a pin, bolt or other fastener that extends through the bushing and through the rigid link at the second connection point, e.g. along the second pivot axis The vehicle component may be configured such that an acute angle between an imaginary straight line through the first and second connection points of the rigid link and an imaginary straight line coaxial with a driving segment of a chain/belt of the drivetrain is in the range of 0° to 30°, e.g. is less than 30°, is less than 20° or is less than 10°. The vehicle component may be configured such that an acute angle between an imaginary straight line through the first and second connection points of the rigid link and an imaginary straight line through the first and second rotational axes is in the range of 0° to 30°, e.g. is less than 30°, is less than 20° or is less than 10°. The vehicle component may be configured such that a minimum distance between the rigid link and (an extension of) an imaginary straight line coaxial with a driving segment of a chain/belt of the drivetrain is no more than 5 cm, no more than 8 cm or no more than 10 cm.

The linkage may comprise a flexing element. The flexing element may be an element with a fixed length between a first connection region and a second connection region of the flexing element, yet that is capable of flexing in a manner that reduces a distance between the first connection region and the second connection region. The (first connection region of the) flexing element may be connected to the first frame portion, e.g. to the seat tube or the down tube. The (second connection region of the) flexing element may be connected to the second frame portion, e.g. to (a rearward/ forward side of) the barrel of the slide link. The flexing element may (be configured to) absorb (and store) energy as a distance between the first connection region and the second connection region is reduced. For example, the flexing element may (be configured to) absorb (and store) energy as the flexing element transitions from a neutral state to a flexed state. Similarly, the flexing element may (be configured to) release (stored) energy as a distance between the first connection region and the second connection region increases. For example, the flexing element may (be configured to) release (stored) energy as the flexing element transitions from a flexed state to a neutral state. The flexing element may comprise a leaf spring. The flexing element may comprise (a sheet/plate of) carbon fiber. The flexing element may have a length, e.g. as measured between the first connection region and the second connection region, of at least 8 cm, at least 10 cm, at least 15 cm or at least 20 cm. Similarly, the flexing element may have a length of at most 30 cm, at most 25 cm, at most 20 cm or at most 15 cm. The flexing element may have a minimum dimension and/or a thickness of 2 mm, 3 mm or 4 mm. Similarly, the flexing element may have a minimum dimension and/or a thickness of at most 10 mm, at most 6 mm or at most 4 mm. The thickness may be measured in a direction perpendicular to a major surface of the flexing element.

The vehicle component may be configured such that an acute angle between an imaginary straight line through the first and second connection regions of the flexing element and an imaginary straight line coaxial with a driving segment of a chain/belt of the drivetrain is in the range of 0° to 30°, e.g. is less than 30°, is less than 20° or is less than 10°. The vehicle component may be configured such that an acute angle between an imaginary straight line through the first and second connection regions of the flexing element and an imaginary straight line through the first and second rotational axes is in the range of 0° to 30°, e.g. is less than 30°, is less than 20° or is less than 10°. The vehicle component may be configured such that a minimum distance between the flexing element and (an extension of) an imaginary straight line coaxial with a driving segment of a chain/belt of the drivetrain is no more than 5 cm, no more than 8 cm or no more than 10 cm.

The linkage may comprise an eccentric. The eccentric may constitute an eccentrically rotatable connection between the first frame portion and to the second frame portion. The eccentric may be directly connected to both the first frame portion and the second frame portion. The eccentric may connect to the first frame portion at the seat tube or proximate to the first rotational axis/bottom bracket. The eccentric may connect to a rearward portion of the first frame portion, e.g. to a most rearward 30%, a most rearward 20%, a most rearward 10% or a most rearward 5% of (the aforementioned lower(most) portion of) the first frame portion. The eccentric may connect to a forward portion of the second frame portion, e.g. to a most forward 10% or a most forward 5% of the second frame portion.

The yoke portion (of the second frame portion) may form the barrel of the slide link. Similarly, the yoke portion may form the piston of the slide link. The yoke portion may be asymmetric relative to a (first) plane orthogonal to the second rotational axis (and midway between the dropouts/openings/bores of the first and second arms). As touched upon supra, the barrel/piston may comprise a circular cylindrical inner/outer wall. An axis of symmetry of the barrel/piston may be parallel to the (aforementioned first) plane. The axis of symmetry of the barrel/piston may be offset by at least 5 mm, at least 10 mm, at least 15 mm or at least 20 mm from the (aforementioned first) plane (in a direction away from the drivetrain). The fork may constitute a chain stay, e.g. together with the remainder (e.g. barrel/piston) of the slide link not formed by the yoke portion. A chain stay may be understood as an element that supports the driving axis (e.g. the bottom bracket) relative to the driven axis (e.g. the second rotational axis), i.e. prevents the driven axis from being (unduly/catastrophically) pulled toward the driving axis as a result of a drivetrain force (e.g. the tension of a driven chain or belt). The chain stay may be an elevated chain stay. An elevated chain stay may be understood as a chain stay having a portion located higher (e.g. more distant from the terrain) than the drivetrain/chain. The chain stay may have the overall general shape of an arch and may comprise a central region. A bottom surface of (the central region of) the chain stay may be located at least 2 cm, at least 4 cm or at least 6 cm higher than the drivetrain. The central region may constitute at least 10%, at least 20% or at least 30% of a length of the chain stay, e.g. as measured in a direction parallel to an imaginary straight line through the first and second rotational axes. The central region may be distanced from at least one of the most forward end and the most rearward end of the chain stay by at least 10%, at least 20% or at least 30% of a length of the chain stay, e.g. as measured in a direction parallel to an imaginary straight line through the first and second rotational axes. An acute angle between the axis of symmetry of the barrel/piston and a longitudinal axis of the central region may be in the range of 30° to 60°. Similarly, an acute angle between the axis of symmetry of the barrel/piston and (a major surface of) the bottom surface of the central region may be in the range of 30° to 60°. The yoke portion may constitute at least 20%, at least 25% or at least 30% of a length of the chain stay, e.g. as measured in a direction parallel to an imaginary straight line through the first and second rotational axes. The yoke portion may constitute no more than 40%, no more than 35% or no more than 30% of a length of the chain stay, e.g. as measured in a direction parallel to an imaginary straight line through the first and second rotational axes.

The yoke portion may comprise at least one, at least two or at least four interior wall(s) that extends from an outer wall of the yoke portion to a wall forming the barrel. An angle between a respective major surface of any adjacent walls may be (substantially) equal to 360° divided by the total number of such walls (provided at a given cross-section (through the barrel and) orthogonal to at least one of a slide axis of the slide element and an axis of symmetry of the barrel). Any of the interior walls may have a length, e.g. as measured parallel to a slide axis of the slide element or an axis of symmetry of the barrel, of at least 50% or at least 80% of a length of the barrel, e.g. as measured parallel to a slide axis of the slide element or an axis of symmetry of the barrel.

A first inner wall of the first arm that faces the second arm may comprise a first bulging region. Similarly, a second inner wall of the second arm that faces the first arm may comprise a second bulging region. The first bulging portion may protrude further in a direction of the second arm than an intermediate region of the first inner wall intermediate the bulging region and the yoke portion. The second bulging portion may protrude further in a direction of the first arm than an intermediate region of the second inner wall intermediate the bulging region and the yoke portion. The protruding of the first/second bulging portion may be in a direction orthogonal to the aforementioned (first) plane. The bulging region may protrude at least 4 mm, at least 6 mm or at least 8 mm further than the (respective) intermediate region. The bulging region may constitute at least 5%, at least 10%, at least 15% or at least 20% of an area of the (respective) inner wall. The bulging region may have a (generally) V-shaped cross-section in a vertical plane orthogonal to the (aforementioned first) plane (through an apex of the bulging region). Similarly, the bulging region may have a (generally) V-shaped cross-section in a horizontal plane orthogonal to the (aforementioned first) plane (through an apex of the bulging region). At least one of the first and second arm may comprise an interior wall that extends from an outer wall of the respective arm that faces away from the other arm to the (respective) first/second inner wall. The interior wall may be substantially perpendicular to the outer wall. The interior wall may intersect the respective first/second inner wall at the apex of the (respective) first/second bulging region. The interior wall may extend over at least 60%, at least 80% or an entirety of a length of the bulging region, e.g. as measured in a longitudinal direction of the first/second arm and/or parallel to the interior wall. The apex of the bulging region may be located in a rearward half or rearward third of the central region. The bulging region may extend rearward of the central region.

The linkage may comprise/consist of a slide link (e.g. as described above) and a rigid link (e.g. as described above). The rigid link may constitute an upper link of the linkage. An imaginary straight line through the first and second connection points of the rigid link may define an imaginary straight line through the upper link. The rigid link may be pivotally connected to the first frame portion at a location higher than a pivot axis at which the slide link pivotally connects to the first frame portion. The rigid link may be pivotally connected to the first frame portion at a first pivot point, i.e. at a first pivot axis, and may be pivotally connected to the second frame portion at a second pivot point, i.e. at a second pivot axis. Similarly, the slide link may be pivotally connected to the first frame portion at a third pivot point, i.e. at a third pivot axis. A (minimum) distance from a point at which the slide link is pivotally connected to the first frame portion (i.e. the third pivot point/axis) to an imaginary straight line through the first rotational axis and the second rotational axis may be less than a (minimum) distance from that imaginary straight line to a point at which the rigid link is pivotally connected to the first frame portion (i.e. the first pivot point/axis). An acute angle between the slide axis of the slide link and an imaginary straight line through the first and second connection points of the rigid link may be in the range of 15° to 85°, e.g. in the range of 20° to 70° or in the range of 30° to 60°.

The linkage may comprise/consist of a slide link (e.g. as described above) and a pair of parallel rigid links (e.g. as described above). The pair of rigid links may constitute an upper link of the linkage. Each rigid link of the pair of rigid links may be pivotally connected to the first frame portion at a first pivot axis and be pivotally connected to the second frame portion at a second pivot axis. An imaginary straight line through the first and second pivot axes may define an imaginary straight line through the upper link. The pair of rigid links may connect to the first frame portion at a location higher than a pivot axis at which the slide link pivotally connects to the first frame portion. The slide link may be pivotally connected to the first frame portion at a third pivot point, i.e. at a third pivot axis. A (minimum) distance from a point at which the slide link is pivotally connected to the first frame portion (i.e. the third pivot point/axis) to an imaginary straight line through the first rotational axis and the second rotational axis may be less than a (minimum) distance from that imaginary straight line to the first pivot axis. An acute angle between the slide axis of the slide link and an imaginary straight line through the first and second connection points of either rigid link, i.e. through the first and second pivot axes, may be in the range of 15° to 85°, e.g. in the range of 20° to 70° or in the range of 30° to 60°.

The linkage may comprise/consist of a slide link (e.g. as described above) and a flexing element (e.g. as described above). The flexing element may constitute an upper link of the linkage. An imaginary straight line through the first and second connection regions of the flexing element may define an imaginary straight line through the upper link. The slide link may be pivotally connected to the first frame portion at a third pivot point, i.e. at a third pivot axis. The flexing element may connect to the first frame portion at a location higher than a pivot axis at which the slide link pivotally connects to the first frame portion (i.e. the third pivot point/axis). A (minimum) distance from a point at which the slide link is pivotally connected to the first frame portion (i.e. the third pivot point/axis) to an imaginary straight line through the first rotational axis and the second rotational axis may be less than a (minimum) distance from that imaginary straight line to a region of the flexing element that connects to the first frame portion, i.e. the first connection region. In the present context, the term "higher" may also be understood as meaning "closer to the (driver/rider/passenger) seat". An acute angle between the slide axis of the slide link and an imaginary straight line through the first and second connection regions of the flexing element may be in the range of 15° to 85°, e.g. in the range of 20° to 70° or in the range of 30° to 60°.

The linkage may comprise/consist of a first rigid link (e.g. as described above) and a second rigid link (e.g. as described above). The first rigid link may constitute an upper link of the linkage. An imaginary straight line through the first and second connection points of the first rigid link may define an imaginary straight line through the upper link. The first rigid link may be pivotally connected to the first frame portion at a location higher than a location at which the second rigid link pivotally connects to the first frame portion. The first rigid link may be pivotally connected to the first frame portion at a first pivot point, i.e. at a first pivot axis, and may be pivotally connected to the second frame portion at a second pivot point, i.e. at a second pivot axis. Similarly, the second rigid link may be pivotally connected to the first frame portion at a third pivot point, i.e. at a third pivot axis, and may be pivotally connected to the second frame portion at a fourth pivot point, i.e. at a fourth pivot axis. A (minimum) distance from a point at which the second rigid link is pivotally connected to the first frame portion (i.e. the second pivot point/axis) to an imaginary straight line through the first rotational axis and the second rotational axis may be less than a (minimum) distance from that imaginary straight line to a point at which the first rigid link is pivotally connected to the first frame portion (i.e. the first pivot point/axis). A distance between the first pivot point/axis and the third pivot point/axis may be less than a distance between the second pivot point/axis and the fourth pivot point/axis. A (minimum) distance between the third pivot point/axis and a (first) imaginary straight line through the first rotational axis and the second rotational axis may be less than a (minimum) distance between the first pivot point/axis and the (first) imaginary straight line. An acute angle between a first imaginary straight line through the first and second connection points of the first rigid link (i.e. through the first and second pivot points/axes) and a second imaginary straight line through the first and second connection points of the second rigid link (i.e. through the third and fourth pivot points/axes) may be in the range of 15° to 85°, e.g. in the range of 20° to 70° or in the range of 30° to 60°.

The linkage may comprise/consist of a first pair of parallel rigid links (e.g. as described above) and a second pair of parallel rigid links (e.g. as described above). The first pair of rigid links may constitute an upper link of the linkage. Each rigid link of the first pair of rigid links may be pivotally connected to the first frame portion at a first pivot axis and be pivotally connected to the second frame portion at a second pivot axis. An imaginary straight line through the first and second pivot axes may define an imaginary straight line through the upper link. Each rigid link of the second pair of rigid links may be pivotally connected to the first frame portion at a third pivot axis and be pivotally connected to the second frame portion at a fourth pivot axis. The first pair of rigid links may be pivotally connected to the first frame portion at a location higher than a location at which the second pair of rigid links pivotally connects to the first frame portion. A (minimum) distance from the third pivot axis to an imaginary straight line through the first rotational axis and the second rotational axis may be less than a (minimum) distance from that imaginary straight line to first pivot axis. An acute angle between a first imaginary straight line through the first and second connection points of either rigid link of the first pair, i.e. through the first and second pivot axes, and a second imaginary straight line through the first and second connection points of either rigid link of the second pair, i.e. through the third and fourth pivot axes, may be in the range of 15° to 85°, e.g. in the range of 20° to 70° or in the range of 30° to 60°. A distance between the first pivot axis and the third pivot axis may be less than a distance between the second pivot axis and the fourth pivot axis. A (minimum) distance between the third pivot axis and a (first) imaginary straight line through the first rotational axis and the second rotational axis may be less than a (minimum) distance between the first pivot axis and the (first) imaginary straight line.

The linkage may comprise/consist of a slide link (e.g. as described above) and an eccentric (e.g. as described above). The eccentric may constitute an upper link of the linkage. The slide link may be pivotally connected to the first frame portion at a third pivot point, i.e. at a third pivot axis. The eccentric may be connected to the first frame portion at a location higher than a pivot axis at which the slide link pivotally connects to the first frame portion (i.e. the third pivot point/axis). A (minimum) distance from a point at which the slide link is pivotally connected to the first frame portion (i.e. the third pivot point/axis) to an imaginary straight line through the first rotational axis and the second rotational axis may be less than a (minimum) distance from that imaginary straight line to the eccentric.

The vehicle component may be configured such that the upper link is proximate to (an extension of) an imaginary straight line coaxial with a driving segment of a chain/belt of the drivetrain. The vehicle component may be configured such that a minimum distance between the upper link and (an extension of) an imaginary straight line coaxial with a driving segment of a chain/belt of the drivetrain is no more than 5 cm, no more than 8 cm or no more than 10 cm. The vehicle component may be configured such that an acute angle between the imaginary straight line through the upper link and an imaginary straight line coaxial with a driving segment of a chain/belt of the drivetrain is in the range of 0° to 30°, e.g. is less than 30°, is less than 20° or is less than 10°. The vehicle component may be configured such that an acute angle between the imaginary straight line through the upper link and an imaginary straight line through the first and second rotational axes is in the range of 0° to 40°, e.g. is less than 30°, is less than 20° or is less than 10°.

The linkage may exhibit an instantaneous center of rotation, e.g. as known in the art of mechanical engineering. For example, the instantaneous center of rotation may be at the intersection of a first imaginary line through two pivot points of a first rigid link and a second imaginary line through two pivot points of a second rigid link. Similarly, the instantaneous center of rotation may be at the intersection of a first imaginary line through two pivot points of a first rigid link and a second imaginary line through a pivot point of a slide link and perpendicular to the slide axis of the slide link. Similarly, the instantaneous center of rotation may be at the intersection of a first imaginary line through first and second connection regions of a flexing element and a second imaginary line through a pivot point of a slide link and perpendicular to the slide axis of the slide link.

The instantaneous center of rotation of the linkage may be located forward of the first rotational axis defined by the first frame portion, e.g. by at least 5 cm, at least 10 cm or at least 15 cm. The instantaneous center of rotation of the linkage may be located in (or at a vertical location corresponding to) a lower portion of the first frame portion, e.g. a lowermost 30%, a lowermost 20%, a lowermost 10% or a lowermost 5% of the first frame portion. The instantaneous center of rotation of the linkage may be located forward of the seat tube. The vehicle component may be configured such that a minimum distance between the instantaneous center of rotation of the linkage and (an extension of) an imaginary straight line coaxial with a driving segment of a chain/belt of the drivetrain is no more than 5 cm, no more than 8 cm or no more than 10 cm. Similarly, the vehicle component may be configured such that a minimum distance between the instantaneous center of rotation of the linkage and (an extension of) an imaginary straight line through the first and second rotational axes is no more than 8 cm, no more than 10 cm or no more than 15 cm.

The vehicle component may be configured such that the instantaneous center of rotation of the linkage is located above (an imaginary straight line through the second rotational axis and) the first rotational axis. The vehicle component may be configured such that a straight line through the instantaneous center of rotation of the linkage and perpendicular to a shortest imaginary straight line between the first rotational axis and the top tube intersects that shortest imaginary straight line at a location between the first rotational axis and the top tube. The vehicle component may be configured such that a first imaginary straight line through the instantaneous center of rotation of the linkage and perpendicular to a second imaginary straight line through the first rotational axis and perpendicular to a third imaginary straight line through the first and second rotational axes intersects that second imaginary straight line upward of the first rotational axis, e.g. at a location between the first rotational axis and the top tube/an uppermost intersection of that second imaginary straight line and the first frame portion.

The vehicle component may be configured such that at least one of the first rotational axis defined by the first frame portion and the second rotational axis defined by the second frame portion is located within an angle enclosed by a first ray through the first and second connection points of a first rigid link and a second ray through the first and second connection points of a second rigid link (not parallel to the first rigid link), which angle has the instantaneous center of rotation of the linkage as a vertex. Similarly, the vehicle component may be configured such that at least one of the first rotational axis defined by the first frame portion and the second rotational axis defined by the second frame portion is located within an angle enclosed by a first ray through the first and second connection points of the rigid link and a second ray through the pivot point of the slide link, which angle has the instantaneous center of rotation of the linkage as a vertex. Similarly, the vehicle component may be configured such that at least one of the first rotational axis defined by the first frame portion and the second rotational axis defined by the second frame portion is located within an angle enclosed by a first ray through the first and second connection regions of the flexing element and a second ray through the pivot point of the slide link, which angle has the instantaneous center of rotation of the linkage as a vertex.

The vehicle component may be configured such that a distance from the instantaneous center of rotation of the linkage to the first rotational axis is no more than 40%, no more than 30%, no more than 20% or no more than 10% of a distance from the instantaneous center of rotation of the linkage to the second rotational axis. The vehicle component may be configured such that a distance from the instantaneous center of rotation of the linkage to the first rotational axis is at least 5%, at least 10% or at least 15% of a distance from the instantaneous center of rotation of the linkage to the second rotational axis.

The linkage may be configured to induce a motion of the first rotational axis in a direction of a (first) imaginary straight line through an instantaneous center of rotation of the linkage and the second rotational axis in response to a force drawing the second rotational axis toward the first rotational axis. The force may be a tensioning force on a chain/belt of the drivetrain, e.g. a tensioning force on induced by the driving sprocket on a segment of the chain/belt connecting the driving sprocket and the driven sprocket. Similarly, the linkage may be configured to induce a motion of the first rotational axis in a direction of an imaginary straight line coaxial with a driving segment of a chain/belt of the drivetrain in response to a force drawing the second rotational axis toward the first rotational axis.

The linkage may be configured to restrict a range of motion of the second frame portion relative to the first frame portion. The linkage may restrict the second frame portion to motion in a plane (substantially) parallel to a plane defined by (the seat tube, top tube and down tube of) the first frame portion. The linkage may be configured to induce a torque on the second frame portion in a first rotational direction in response to a torque on the first frame portion in a second rotational direction opposite the first rotational direction. The torque on the first/second frame portion may induce rotational motion of the first/second frame portion relative to an axis of rotation (substantially) parallel to the first/second rotational axis. The torque on the first/second frame portion may induce rotational motion of the first/second frame portion in a plane (substantially) parallel to a plane defined by (the seat tube, top tube and down tube of) the first frame portion.

The linkage may be configured such that the first frame portion, in a first end of range position of the linkage as induced by a rotation of the second frame portion in a (third) rotational direction relative to the first frame portion, is substantially as free to rotate in the (third) rotational direction as in a mid-range position of the linkage. The (third) rotational direction may be a direction of rotation that, in the case of the first frame portion, effects a reduction of an acute angle between a (first) imaginary straight line through an instantaneous center of rotation of the linkage and the second rotational axis and a (second) imaginary straight line through the instantaneous center of rotation and the first rotational axis. The mid-range position of the linkage may be rotationally halfway between the first end of range position and a second end of range position of the linkage as induced by a rotation of the second frame portion in a (fourth) rotational direction relative to the first frame portion, the fourth rotational direction being opposite to the (third) rotational direction.

A (minimum) distance between a pivot point/pivot axis at which a slide link of the linkage pivotally connects to the first frame portion and a (first) imaginary straight line through the first rotational axis and the second rotational axis may be less than a (minimum) distance between a pivot point/pivot axis at which a rigid link/the upper link of the linkage connects to the first frame portion and the (first) imaginary line.

The (four-bar) linkage and drivetrain may be the sole elements of the vehicle that transfer (substantial amounts of) kinetic energy from the first frame portion to the second frame portion (or vice versa). The (elements of the) (four-bar) linkage may be the sole elements structurally interconnecting the first frame portion and the second frame portion. In the present context, the interconnection of the first frame portion and the second frame portion provided by a drivetrain, e.g. a chain/belt thereof, is not considered to constitute a structural interconnection (since the drivetrain is typically is designed solely to transmit a propulsive forces from a power source (e.g. rider/motor) to a terrain-engaging element as opposed to being designed to transmit arbitrary forces from one structure to another structure). To the respect that the reader considers a drivetrain to constitute a structural interconnection, the present disclosure may be understood as teaching that the (four-bar) linkage and the drivetrain may be the sole elements structurally interconnecting the first frame portion and the second frame portion. The first frame portion may be structurally interconnected to the second frame portion exclusively via the (four-bar) linkage (and drivetrain). The vehicle may be devoid of elements other than the (four-bar) linkage (and drivetrain) structurally interconnecting the first frame portion and the second frame portion. The vehicle may be devoid of a shock-absorber assembly (interconnecting the first frame portion and the second frame portion) distinct from the (four-bar) linkage. In the present context, shift cables, brake cables, power cables, etc. are not considered to constitute elements that transfer (substantial amounts of) kinetic energy from the first frame portion to the second frame portion (or vice versa).

The vehicle component may comprise an energy management system. The energy management system may be (at least partially) interposed between the first frame portion and the second frame portion. The energy management system may be (interposed between the first frame portion and the second frame portion by being) (pivotally) connected the first frame portion (at at least one connection point) and may be (pivotally) connected the second frame portion (at at least one connection point). The energy management system may influence an exchange of kinetic energy between the first and second frame portion. The energy management system may effect a time delay in a transfer of kinetic energy from the first frame portion to the second frame portion. Similarly, the energy management system may effect a time delay in a transfer of kinetic energy from the second frame portion to the first frame portion. The energy management system may receive a first amount of kinetic energy from the first frame portion and/or the second frame portion and output, in total in response to the receipt of the first amount of kinetic energy, a second amount of kinetic energy (with a time delay) to the first frame portion and/or the second frame portion, the second amount of kinetic energy being less than the first amount. The energy management system may dissipate an amount of energy equal to a difference between the first amount of kinetic energy and the second amount of kinetic energy as heat. The energy management system may be a (purely) mechanical system. The energy management system may be a (purely) passive system.

The energy management system may comprise a shock absorber. The shock absorber may interconnect the first and second frame portions. The shock absorber may be pivotally linked to the second frame portion, e.g. at a location intermediate the upper link (i.e. a location at which the upper link connects to the second frame portion) and the second rotational axis. The shock absorber may be pivotally linked to the first frame portion, e.g. to the top tube or the down tube. The shock absorber may be configured such that a shortening/lengthening of a distance between a pivot axis at which the shock absorber is linked to the second frame portion and a pivot axis at which the shock absorber is linked to the first frame portion induces (shock absorbing, linear) travel of the shock absorber.

An operating state exhibited by the energy management system when no external forces (that would induce a (substantial) change in operating state) are applied to the energy management system may be termed a "neutral state". Similarly, the neutral state may be an operating state in which the energy management system stores no potential energy (that can be converted by the energy management system into kinetic energy). The linkage and the energy management system may be configured such that (the (inherently) limited range of motion of) the linkage restricts motion of the energy management system to within the (designed/permissible) range of travel of the energy management system.

The energy management system may comprise at least one material and/or component that absorbs and stores energy, i.e. converts kinetic energy into potential energy, e.g. by elastic deformation, as the energy management system transitions to a first operating state different from the neutral state. The material may be an elastic material. The component may be a (steel/air) spring. The (at least one material and/or component of the) energy management system may be configured to convert the stored (potential) energy into kinetic energy as the energy management system transitions to the neutral state from the first operating state. More generally, the energy management system may comprise at least one material and/or component that converts kinetic energy into potential energy as the energy management system transitions to any operating state (within the range of travel of the energy management system) different from the neutral state, which at least one material and/or component converts said potential energy into kinetic energy as the energy management system transitions to the neutral state from said any operating state. The energy management system may comprise at least one material and/or component that converts kinetic energy into potential energy as the energy management system transitions "away from" the neutral state, i.e. from any operating state (within the range of travel of the energy management system) to any other (within the range of travel of the energy management system) more removed from the neutral state, which at least one material and/or component converts said potential energy into kinetic energy as the energy management system transitions "toward" the neutral state, i.e. to said any operating state from said any other operating state. For the sake of conciseness, such conversion of kinetic energy to potential energy and such conversion of potential energy into kinetic energy will be termed "lossless conversion" as a shorthand notation.

Similarly, the energy management system may comprise at least one material and/or component that converts kinetic energy into heat as the energy management system transitions to a first operating state different from the neutral state. The material may be a (viscous) oil. The component may be/comprise a friction surface. The component may be/comprise a nozzle. The (at least one material and/or component of the) energy management system may be configured to convert kinetic energy into heat as the energy management system transitions to the neutral state from the first operating state. More generally, the energy management system may comprise at least one material and/or component that converts kinetic energy into heat as the energy management system transitions to any operating state (within the range of travel of the energy management system) different from the neutral state, which at least one material and/or component may moreover convert kinetic energy into heat as the energy management system transitions to the neutral state from said any operating state. The energy management system may comprise at least one material and/or component that converts kinetic energy into heat as the energy management system transitions "away from" the neutral state, i.e. from any operating state (within the range of travel of the energy management system) to any other (within the range of travel of the energy management system) more removed from the neutral state, which at least one material and/or component may moreover convert kinetic energy into heat as the energy management system transitions "toward" the neutral state, i.e. to said any operating state from said any other operating state. For the sake of conciseness, such conversion of kinetic energy to heat will be termed "lossy conversion" as a shorthand notation.

At least a portion or an entirety of the energy management system may be located within the barrel of the slide link. Similarly, an entirety of the energy management system may be mounted on or located inside the second frame portion. The energy management system may be devoid of a heat sink (distinct from the at least one material and/or component that converts kinetic energy into heat).

A ratio of lossless conversion to overall (i.e. lossy plus lossless) conversion exhibited by the energy management system may depend, inter alia, on an operating state of the energy management system, e.g. on a "distance" of the instant operating state from the neutral state (in terms of travel) and/or on whether the energy management system is transitioning "away from" or "toward" the neutral state. The ratio of lossless conversion to overall (i.e. lossy plus lossless) conversion exhibited by the energy management system may user adjustable, e.g. by means of switches and/or dials (as known in the art). Accordingly, the ratio of lossless conversion to overall conversion exhibited by the energy management system may depend, inter alia, on a (user adjustable) mode of the energy management system.

The energy management system may be configured such that the vehicle, in a neutral (i.e. non-dynamic), payload-bearing state, exhibits squat (a.k.a. "sag") in the range of 15% to 35%. The payload-bearing state may be a state in which the vehicle is bearing a payload in the range of 50 kg to 100 kg. In the present disclosure, the term "squat" may be understood as designating an operating state in which the first rotational axis/bottom bracket is lower (i.e. closer to the terrain) than the first rotational axis/bottom bracket in an unladen, neutral state. Squat may be expressed as a percentage of travel between an unladen, neutral state and a (respective) end of range (e.g. as limited by the linkage). In the present disclosure, the term "anti-squat" (a.k.a. "jacking") may be understood as designating an operating state in which the first rotational axis/bottom bracket is higher (i.e. farther from the terrain) than the first rotational axis/bottom bracket in an unladen, neutral state. Anti-squat may be expressed as a percentage of travel between an unladen, neutral state and a (respective) end of range (e.g. as limited by the linkage).

The unladen, neutral state may correspond to a mid-range position of the linkage, e.g. as defined supra. Defining the unladen, neutral state on a linear scale representative of a percentage of the total amount of linear sliding motion permitted at the slide link by the operating range of the linkage or a percentage of a total amount of rotation permitted at any pivotal connection point of the linkage to the first/second frame portion by the operating range of the linkage, where a (full) anti-squat end of range of the linkage corresponds to 0%, the mid-range position corresponds to 50% and a (full) squat end of range of the linkage corresponds to 100%, the unladen, neutral state may be in the range of 30% to 50%, e.g. in the range of 30% to 40% or 40% to 50%, or in the range of 50% to 70%, e.g. in the range of 50% to 60% or 60% to 70%.

As touched upon above, the characteristics of the energy management system may be direction dependent. For example, the characteristics of the energy management system when transitioning "away from" the neutral state may differ from characteristics of the energy management system when transitioning "toward" the neutral state. Hereinbelow, an imparting of "kinetic energy of squat inducing motion" into the energy management system may be understood as kinetic energy imparted into the energy management system as a result of motion (of elements of the vehicle component) that yields further squat, i.e. an imparting of kinetic energy into the energy management system as the energy management system transitions in a squat direction, i.e. in a direction of a state of the energy management system corresponding to (full) squat. Similarly, an imparting of "kinetic energy of motion inducing less anti-squat" into the energy management system may be understood as kinetic energy imparted into the energy management system as a result of motion (of elements of the vehicle component) that yields less anti-squat, i.e. an imparting of kinetic energy into the energy management system as the energy management system transitions in a direction of a state of the energy management system corresponding to (full) squat. These remarks apply, mutatis mutandis, to similar expressions such as "kinetic energy of motion inducing less squat" and "kinetic energy of anti-squat inducing motion".

The vehicle component may be configured such that, at 25% squat, at least 60%, at least 70%, at least 80% or at least 90% of kinetic energy (of squat inducing motion) imparted, e.g. via the first and/or second rotational axis, into the energy management system is converted into potential energy. The vehicle component may be configured such that, in a range of 0% to 60% squat, at least 60%, at least 70%, at least 80% or at least 90% of kinetic energy (of squat inducing motion) imparted, e.g. via the first and/or second rotational axis, into the energy management system is converted into potential energy. The vehicle component may be configured such that, in a range of 0% to 60% anti-squat, at least 60%, at least 70%, at least 80% or at least 90% of kinetic energy (of anti-squat inducing motion) imparted, e.g. via the first and/or second rotational axis, into the energy management system is converted into potential energy. The vehicle component may be configured such that, in a range of 40% to 75% squat, at least 50%, at least 60%, at least 70% or at least 80% of kinetic energy (of squat inducing motion) imparted, e.g. via the first and/or second rotational axis, into the energy management system is converted into potential energy. The vehicle component may be configured such that, in a range of 40% to 75% anti-squat, at least 60%, at least 70% or at least 80% of kinetic energy (of anti-squat inducing motion) imparted, e.g. via the first and/or second rotational axis, into the energy management system is converted into potential energy. The vehicle component may be configured such that, in a range of 70% to 90% squat, at least 30%, at least 40%, at least 50% or at least 60% of kinetic energy (of squat inducing motion) imparted, e.g. via the first and/or second rotational axis, into the energy management system is converted into potential energy. The vehicle component may be configured such that, in a range of 70% to 90% anti-squat, at least 30%, at least 40%, at least 50% or at least 60% of kinetic energy (of anti-squat inducing motion) imparted, e.g. via the first and/or second rotational axis, into the energy management system is converted into potential energy. The vehicle component may be configured such that, in a range of 90% to 0% anti-squat, e.g. a range of 70% to 0% anti-squat, not more than 15%, not more than 10% or not more than 5% of kinetic energy (of motion inducing less anti-squat) imparted, e.g. via the first and/or second rotational axis, into the energy management system is converted into heat. The vehicle component may be configured such that, in a range of 90% to 0% squat, e.g. a range of 70% to 0% squat, not more than 15%, not more than 10% or not more than 5% of kinetic energy (of motion inducing less squat) imparted, e.g. via the first and/or second rotational axis, into the energy management system is converted into heat.

The energy management system, at 25% squat, e.g. relative to a mid-range position (of the energy management system), may convert at least 60%, at least 70%, at least 80% or at least 90% of kinetic energy (of squat inducing motion) imparted into the energy management system into potential energy. The energy management system may, in a range of 0% to 60% squat, e.g. relative to a mid-range position (of the energy management system), convert at least 60%, at least 70%, at least 80% or at least 90% of kinetic energy (of squat inducing motion) imparted into the energy management system into potential energy. The energy management system, in a range of 0% to 60% anti-squat, e.g. relative to a mid-range position (of the energy management system), may convert at least 60%, at least 70%, at least 80% or at least 90% of kinetic energy (of anti-squat inducing motion) imparted into the energy management system into potential energy. The energy management system, in a range of 40% to 75% squat, e.g. relative to a mid-range position (of the energy management system), may convert at least 50%, at least 60%, at least 70% or at least 80% of kinetic energy (of squat inducing motion) imparted into the energy management system into potential energy. The energy management system, in a range of 40% to 75% anti-squat, e.g. relative to a mid-range position (of the energy management system), may convert at least 60%, at least 70% or at least 80% of kinetic energy (of anti-squat inducing motion) imparted into the energy management system into potential energy. The energy management system, in a range of 70% to 90% squat, e.g. relative to a mid-range position (of the energy management system), may convert at least 30%, at least 40%, at least 50% or at least 60% of kinetic energy (of squat inducing motion) imparted into the energy management system into potential energy. The energy management system, in a range of 70% to 90% anti-squat, e.g. relative to a mid-range position (of the energy management system), may convert at least 30%, at least 40%, at least 50% or at least 60% of kinetic energy (of anti-squat inducing motion) imparted into the energy management system into potential energy. The energy management system may be configured such that, in a range of 90% to 0% anti-squat, e.g. relative to a mid-range position (of the energy management system), e.g. a range of 70% to 0% anti-squat, not more than 15%, not more than 10% or not more than 5% of kinetic energy (of motion inducing less anti-squat) imparted into the energy management system is converted into heat. The energy management system may be configured such that, in a range of 90% to 0% squat, e.g. relative to a mid-range position (of the energy management system), e.g. a range of 70% to 0% squat, not more than 15%, not more than 10% or not more than 5% of kinetic energy (of motion inducing less squat) imparted into the energy management system is converted into heat.

The mid-range position (of the energy management system) may correspond to a position halfway between the respective ends of the range of travel of the energy management system. Defining the mid-range position (of the energy management system) on a linear scale representative of a percentage of the total range of travel of the energy management system, where a (full) anti-squat end of range of the travel corresponds to 0%, the mid-range position corresponds to 50% and a (full) squat end of range of the travel corresponds to 100%, the mid-range position may be in the range of 30% to 50%, e.g. in the range of 30% to 40% or 40% to 50%, or in the range of 50% to 70%, e.g. in the range of 50% to 60% or 60% to 70%. The range of travel of the energy management system may be limited by the linkage. Defining the mid-range position (of the energy management system) on a linear scale representative of a percentage of the total amount of linear sliding motion permitted at the slide link by the operating range of the linkage or a percentage of a total amount of rotation permitted at any pivotal connection point of the linkage to the first/second frame portion by the operating range of the linkage, where a (full) anti-squat end of range of the linkage corresponds to 0%, the mid-range position corresponds to 50% and a (full) squat end of range of the linkage corresponds to 100%, the mid-range position may be in the range of 30% to 50%, e.g. in the range of 30% to 40% or 40% to 50%, or in the range of 50% to 70%, e.g. in the range of 50% to 60% or 60% to 70%.

A ratio of lossless conversion to overall (i.e. lossy plus lossless) conversion exhibited by the combination of vehicle and payload may be characterized/defined by a "damping ratio" (as known in the art). The damping ratio may be measured/determined without regard for a damping effect of the terrain-engaging elements and/or without regard for a damping effect of a front suspension. The damping ratio may be measured/determined (exclusively) in terms of an oscillatory response of the second frame portion relative to the payload-bearing front frame portion, e.g. in response to forces induced at the second rotational axis (by traveling over terrain). The payload may be a payload in the range of 50 kg to 100 kg. The damping ratio may be a damping ratio of less than 0.3, less than 0.2 or less than 0.1.

In the present disclosure, the verb "may" is used to designate optionality/non-compulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

In the present disclosure, the term "any" may be understood as designating any number of the respective elements, e.g. as designating one, at least one, at least two, each or all of the respective elements. Similarly, the term "any" may be understood as designating any collection(s) of the respective elements, e.g. as designating one or more collections of the respective elements, wherein a (respective) collection may comprise one, at least one, at least two, each or all of the respective elements. The respective collections need not comprise the same number of elements.

In the present disclosure, the expression "at least one" is used to designate any (integer) number or range of (integer) numbers (that is technically reasonable in the given context). As such, the expression "at least one" may, inter alia, be understood as one, two, three, four, five, ten, fifteen, twenty or one hundred. Similarly, the expression "at least one" may, inter alia, be understood as "one or more," "two or more" or "five or more."

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

In the present disclosure, many features are described as being optional, e.g. through the use of the verb "may" or the use of parentheses. For the sake of brevity and legibility, the present disclosure does not explicitly recite each and every combination and/or permutation that may be obtained by choosing from the set of optional features. However, the present disclosure is to be interpreted as explicitly disclosing all such combinations/permutations. For example, a system described as having three optional features may be embodied in seven different ways, namely with just one of the three possible features, with any two of the three possible features or with all three of the three possible features.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of the invention, even those disclosed solely in combination with other features of the invention, may be combined in any configuration excepting those readily apparent to the person skilled in the art as nonsensical. Likewise, use of the singular and plural is solely for the sake of illustration and is not to be interpreted as limiting. Except where the contrary is explicitly noted, the plural may be replaced by the singular and vice-versa.

The above disclosure may be summarized as comprising the following embodiments.

Embodiment 1

A vehicle component, comprising: a first frame portion that defines a first rotational axis; a second frame portion that defines a second rotational axis; a linkage that movably connects said first frame portion and said second frame portion; and an energy management system interposed between the first frame portion and the second frame portion, wherein said linkage is configured to induce a motion of said first rotational axis in a direction of a first imaginary straight line through an instantaneous center of rotation of said linkage and said second rotational axis in response to a force drawing said second rotational axis toward said first rotational axis, and said vehicle component, in a range of 0% to 60% squat, converts at least 60% of kinetic energy of squat inducing motion imparted into said energy management system into potential energy.

Embodiment 2

The vehicle component of Embodiment 1, wherein: said first frame portion, in a first end of range position of said linkage as induced by a rotation of said second frame portion in a first rotational direction relative to said first frame portion, is substantially as free to rotate in said first rotational direction as in a mid-range position of said linkage, said first rotational direction being a direction of rotation that, in the case of said first frame portion, effects a reduction of an acute angle between said first imaginary straight line and a second imaginary straight line through said instantaneous center of rotation and said first rotational axis.

Embodiment 3

The vehicle component of Embodiment 2, wherein said mid-range position of said linkage is rotationally halfway between said first end of range position and a second end of range position of said linkage as induced by a rotation of said second frame portion in a second rotational direction relative to said first frame portion, said second rotational direction being opposite to said first rotational direction.

Embodiment 4

A vehicle component, comprising: a first frame portion that defines a first rotational axis; a second frame portion that defines a second rotational axis; a rigid link pivotally connected to said first frame portion at a first pivot point and pivotally connected to said second frame portion at a second pivot point; a slide link pivotally connected to said first frame portion at a third pivot point and slidingly engaging said second frame portion along a sliding axis; and an energy management system at least partially interposed between the first frame portion and the second frame portion, wherein a distance of said third pivot point to a first imaginary line through said first rotational axis and said second rotational axis is less than a distance of said first pivot point to said first imaginary line, and said vehicle component, in a range of 0% to 60% squat, converts at least 60% of kinetic energy of squat inducing motion imparted into said energy management system into potential energy.

Embodiment 5

The vehicle component of Embodiment 4, wherein: a third imaginary line through said first pivot point and said second pivot point is within 40° of parallel to said first imaginary line, and an acute angle between said sliding axis and said third imaginary line is at least 15° and no more than 85°.

Embodiment 6

A vehicle component, comprising: a first frame portion that defines a first rotational axis; a second frame portion that defines a second rotational axis; a first rigid link pivotally connected to said first frame portion at a first pivot point and pivotally connected to said second frame portion at a second pivot point; and a second rigid link pivotally connected to said first frame portion at a third pivot point and pivotally connected to said second frame portion at a fourth pivot point; and an energy management system at least partially interposed between the first frame portion and the second frame portion, wherein a distance between said third pivot point and said first pivot point is less than a distance between said fourth pivot point and said second pivot point, a distance of said third pivot point to a first imaginary line through said first rotational axis and said second rotational axis is less than a distance of said first pivot point to said first imaginary line, and said vehicle component, in a range of 0% to 60% squat, converts at least 60% of kinetic energy of squat inducing motion imparted into said energy management system into potential energy.

Embodiment 7

The vehicle component of Embodiment 6, wherein: a third imaginary line through said first pivot point and said second pivot point is within 40° of parallel to said first imaginary line, an acute angle between said third imaginary line and a fourth imaginary line through said third pivot point and said fourth pivot point is at least 20° and no more than 70°.

Embodiment 8

A vehicle component, comprising: a first frame portion that defines a rotational axis of a driving sprocket as a first rotational axis; a second frame portion that defines a rotational axis of a driven sprocket as a second rotational axis; a first rigid link pivotally connected to said first frame portion at a first pivot point and pivotally connected to said second frame portion at a second pivot point; a slide link pivotally connected to said first frame portion at a third pivot point and slidingly engaging said second frame portion along a sliding axis; and an energy management system at least partially interposed between the first frame portion and the second frame portion, wherein said first rigid link is proximate to a second imaginary line coaxial with a driving segment of a chain that links said driving sprocket and said driven sprocket, said first rigid link and said slide link being configured to induce a motion of said first rotational axis in a direction of said second imaginary line in response to a force drawing said second rotational axis toward said first rotational axis, and said vehicle component, in a range of 0% to 60% squat, converts at least 60% of kinetic energy of squat inducing motion imparted into said energy management system into potential energy.

Embodiment 9

The vehicle component of Embodiment 8, wherein: a distance between said third pivot point and a first imaginary line through said first rotational axis and said second rotational axis is less than a distance between said first pivot point and said first imaginary line.

Embodiment 10

The vehicle component of Embodiment 8 or 9, wherein: a third imaginary line through said first pivot point and said second pivot point is within 40° of parallel to said first imaginary line.

Embodiment 11

The vehicle component structure of any one of Embodiments 8-10, wherein: an acute angle between said sliding axis and said third imaginary line is at least 15° and no more than 85°.

Embodiment 12

A vehicle component, comprising: a first frame portion that defines a rotational axis of a driving sprocket as a first rotational axis; a second frame portion that defines a rotational axis of a driven sprocket as a second rotational axis;

a first rigid link pivotally connected to said first frame portion at a first pivot point and pivotally connected to said second frame portion at a second pivot point; a second rigid link interconnecting said first frame portion and said second frame portion; and an energy management system at least partially interposed between the first frame portion and the second frame portion, wherein said first rigid link is proximate to a second imaginary line coaxial with a driving segment of a chain that links said driving sprocket and said driven sprocket, said first and second rigid link being configured to induce a motion of said first rotational axis in a direction of said second imaginary line in response to a force drawing said second rotational axis toward said first rotational axis, and said vehicle component, in a range of 0% to 60% squat, converts at least 60% of kinetic energy of squat inducing motion imparted into said energy management system into potential energy.

Embodiment 13

The vehicle component of Embodiment 10, wherein: a distance between said third pivot point and said first pivot point is less than a distance between said fourth pivot point and said second pivot point,

Embodiment 14

The vehicle component of Embodiment 12 or 13, wherein: a distance between said third pivot point and a first imaginary line through said first rotational axis and said second rotational axis is less than a distance between said first pivot point to said first imaginary line.

Embodiment 15

The vehicle component of any one of Embodiments 12-14, wherein: a third imaginary line through said first pivot point and said second pivot point is within 40° of parallel to said first imaginary line.

Embodiment 16

The vehicle component of any one of Embodiments 12-15, wherein: an acute angle between said third imaginary line and a fourth imaginary line through said third pivot point and said fourth pivot point is at least 20° and no more than 70°.

Embodiment 17

A vehicle component, comprising: a first frame portion that defines a first rotational axis; a second frame portion that defines a second rotational axis; a first rigid link pivotally connected to said first frame portion exclusively at a first pivot point and pivotally connected to said second frame portion at a second pivot point; and a second rigid link pivotally connected to said first frame portion at a third pivot point and pivotally connected to said second frame portion at a fourth pivot point, wherein a distance between said third pivot point and said first pivot point is less than a distance between said fourth pivot point and said second pivot point, and a distance between said third pivot point and a first imaginary line through said first rotational axis and said second rotational axis is less than a distance of said first pivot point to said first imaginary line.

Embodiment 18

The vehicle component structure of Embodiment 17, wherein: said first frame portion comprises a top tube, a bottom bracket region and a seat tube that rigidly connects said top tube and said bottom bracket region.

Embodiment 19

The vehicle component of Embodiment 17 or 18, wherein: a third imaginary line through said first pivot point and said second pivot point is within 40° of parallel to said first imaginary line, an acute angle between said third imaginary line and a fourth imaginary line through said third pivot point and said fourth pivot point is at least 20° and no more than 70°.

Embodiment 20

A vehicle, comprising: a drivetrain; a first frame portion that defines a first rotational axis; a second frame portion that defines a second rotational axis; a rigid link pivotally connected to said first frame portion at a first pivot point and pivotally connected to said second frame portion at a second pivot point; and a slide link pivotally connected to said first frame portion at a third pivot point and slidingly engaging said second frame portion along a sliding axis, wherein said first frame portion is structurally interconnected to said second frame portion exclusively via said drivetrain, said rigid link and said slide link.

Embodiment 21

A vehicle component, comprising: a first frame portion; a second frame portion; a rigid link pivotally connected to said first frame portion and pivotally connected to said second frame portion; a slide link pivotally connected to said first frame portion and slidingly engaging said second frame portion; and an energy management system, wherein an entirety of said energy management system is located within at least one of said second frame portion and a barrel of said slide link.

Embodiment 22

The vehicle component of Embodiment 21, wherein: said first frame portion that defines a first rotational axis, said second frame portion that defines a second rotational axis, said rigid link is pivotally connected to said first frame portion at a first pivot point and is pivotally connected to said second frame portion at a second pivot point; said slide link is pivotally connected to said first frame portion at a third pivot point; and a distance of said third pivot point to a first imaginary line through said first rotational axis and said second rotational axis is less than a distance of said first pivot point to said first imaginary line.

Embodiment 23

The vehicle component of Embodiment 21 or 22, wherein: said vehicle component, in a range of 0% to 60% squat, converts at least 60% of kinetic energy of squat inducing motion imparted into said energy management system into potential energy.

A vehicle component has been described. It is not the intent of this disclosure to limit the claimed invention to the examples, variations, and exemplary embodiments described in the specification. Those skilled in the art will recognize that variations will occur when embodying the claimed invention in specific implementations and environments.

It is possible to implement certain features described in separate embodiments in combination within a single embodiment. Similarly, it is possible to implement certain features described in single embodiments either separately or in combination in multiple embodiments. The inventor envisions that these variations fall within the scope of the claimed invention.

While the examples, exemplary embodiments, and variations are helpful to those skilled in the art in understanding the claimed invention, it should be understood that the scope of the claimed invention is defined solely by the following claims and their equivalents.

What is claimed is:

1. A vehicle component, comprising:
a front frame adapted to support a rider's mass;
a four-bar linkage including a first link member and a second link member;
a swing arm including a first end and couplable to a rear wheel on an opposing end distal to the first end; and
an energy management system interposed between the front frame and the swing arm configured to convert at least 60% of kinetic energy imparted into the energy management system into potential energy over a range of 0% to 60% squat of the vehicle component;
the first link member and the second link member movably coupling the swing arm to the front frame and arranged to create an equipoise state between forces of inertia and acceleration;
wherein the acceleration is caused by a horizontal force applied to the opposing end of the swing arm.

2. The vehicle component of claim 1, wherein the first link member and the second link member are positioned and angled to create equipoise between forces of inertia and acceleration and braking while allowing the vehicle to ground trace.

3. The vehicle component of claim 1, wherein the first link member and the second link member are both pivotally coupled to the front frame.

4. The vehicle component of claim 3, wherein:
the front frame includes a bottom bracket sized and positioned to receive a driving device;
the first link member is pivotally coupled to the swing arm about a first pivot point; and
the second link member is pivotally coupled to the front frame about a rotational axis of the bottom bracket and is pivotally coupled to the swing arm about a second pivot point located lower than the first pivot point.

5. The vehicle component of claim 1, the second link member comprising a slide link slidably coupled to the first end of the swing arm and a pivoting joint pivotally coupling the slide link to the front frame.

6. The vehicle component of claim 5, wherein the first link member is pivotally coupled about a pivot point on the front frame located higher than the pivoting joint.

7. The vehicle component of claim 1, wherein the energy management system comprises a spring to store the potential energy.

8. The vehicle component of claim 1, wherein the acceleration is provided by a motor of the vehicle.

9. The vehicle component of claim 1, wherein the acceleration is provided by a pedaling action of a rider of the vehicle.

10. The vehicle component of claim 1, wherein the acceleration is provided by a braking action of the vehicle.

11. The vehicle component of claim 1, wherein, over a range of 0% to 60% squat, at least 80% of kinetic energy imparted into the energy management system is converted into potential energy.

12. A vehicle component, comprising:
a front triangle including a bottom bracket, a seat tube, and a down tube;
a swing arm having a first end and couplable to a rear wheel on an opposing end distal to the first end;
a first link member pivotally coupled to the swing arm near the first end and pivotally coupled to the front triangle;
a second link member pivotally coupled to the swing arm at or near the first end and pivotally coupled to the front triangle about an axis that is no higher than a rotational axis of the bottom bracket; and
an energy management system interposed between the front triangle and the swing arm and configured to convert at least 60% of kinetic energy imparted into the energy management system into potential energy over a range of 0% to 60% squat of the vehicle component.

13. The vehicle component of claim 12, the first link member pivotally coupled to the swing arm at a first pivot point; and
the second link member pivotally coupled to the swing arm at a second pivot point that is closer to the first end of the swing arm than the first pivot point.

14. The vehicle component of claim 12, wherein the first link member and the second link member are positioned to create an equipoise between forces of inertia and acceleration which results in a substantially fixed relative position between the front triangle and the swing arm during the acceleration.

15. The vehicle component of claim 12, wherein, over a range of 0% to 60% squat, at least 80% of kinetic energy imparted into the energy management system is converted into potential energy.

16. The vehicle component of claim 14, wherein the acceleration results from a forward propulsion or a braking of the vehicle.

17. A vehicle component, comprising:
a front triangle including a bottom bracket, a seat tube, and a down tube;
a swing arm having a first end and couplable to a rear wheel on an opposing end distal to the first end;
a sliding link slidable positioned within the swing arm at the first end and pivotally coupled to the front triangle proximate to the down tube;
a link member pivotally connected between the swing arm and the seat tube; and
an energy management system interposed between the front triangle and the swing arm and configured to convert at least 60% of kinetic energy imparted into the energy management system into potential energy over a range of 0% to 60% squat of the vehicle component.

18. The vehicle component of claim 17, wherein the sliding link and the link member are arranged to create an equipoise between forces of inertia and acceleration which results in a substantially fixed relative position between the front triangle and the swing arm during the acceleration.

19. The vehicle component of claim 18, wherein the acceleration comprises a forward acceleration or a braking action of the vehicle.

20. The vehicle component of claim 17, wherein, over a range of 0% to 60% squat, at least 80% of kinetic energy imparted into the energy management system is converted into potential energy.

21. The vehicle component of claim 17, wherein the energy management system comprises a spring to store the potential energy.

22. A vehicle component, comprising:
- a first frame portion that defines a first rotational axis of a drive element;
- a second frame portion that defines a second rotational axis of a rear wheel;
- a linkage that movably connects said first frame portion and said second frame portion; and
- an energy management system interposed between the first frame portion and the second frame portion and configured to convert at least 60% of kinetic energy imparted into the energy management system into potential energy over a range of 0% to 60% squat of the vehicle component;
- wherein said linkage is configured to induce a motion of said first rotational axis in a direction toward a first imaginary straight line through an instantaneous center of rotation of said linkage and said second rotational axis in response to a horizontal force applied to the second frame portion at the second rotational axis and drawing said second rotational axis toward said first rotational axis.

23. The vehicle component of claim 22, wherein said vehicle component, over a range of 0% to 60% squat, converts at least 80% of kinetic energy imparted into said energy management system into potential energy.

\* \* \* \* \*